(12) United States Patent
Aponte-Rivera

(10) Patent No.: US 9,944,343 B2
(45) Date of Patent: Apr. 17, 2018

(54) SIDE-BY-SIDE FLEXIBLE TWIN BICYCLES

(71) Applicant: Ceferino Aponte-Rivera, Dorado, PR (US)

(72) Inventor: Ceferino Aponte-Rivera, Dorado, PR (US)

(*) Notice: Subject to any disclaimer, the term of this patent is extended or adjusted under 35 U.S.C. 154(b) by 12 days.

(21) Appl. No.: 15/155,736

(22) Filed: May 16, 2016

(65) Prior Publication Data

US 2016/0257368 A1    Sep. 8, 2016

Related U.S. Application Data

(63) Continuation-in-part of application No. 14/450,268, filed on Aug. 3, 2014, now Pat. No. 9,340,250.

(51) Int. Cl.
| | |
|---|---|
| *B62K 13/06* | (2006.01) |
| *B62K 3/14* | (2006.01) |
| *B62K 3/12* | (2006.01) |

(52) U.S. Cl.
CPC ............... *B62K 13/06* (2013.01); *B62K 3/14* (2013.01); *B62K 3/12* (2013.01); *B62K 2003/125* (2013.01)

(58) Field of Classification Search
CPC . B62K 13/06; B62K 3/14; B62K 3/12; B62K 2003/125
See application file for complete search history.

(56) References Cited

U.S. PATENT DOCUMENTS

| | | | | | |
|---|---|---|---|---|---|
| 2,694,582 | A | * | 11/1954 | Reside ............... | B62K 13/06 280/209 |
| 3,768,834 | A | * | 10/1973 | Singleton ........... | B62K 13/06 280/209 |
| 3,836,175 | A | * | 9/1974 | Pomerance ......... | B62K 13/06 280/209 |
| 3,902,738 | A | * | 9/1975 | Gandrud ............ | B62K 13/06 280/209 |
| 4,227,589 | A | * | 10/1980 | Chika ................ | B62K 13/06 180/205.7 |
| 4,290,620 | A | * | 9/1981 | Chika ................ | B60G 21/055 280/209 |
| 5,511,809 | A | * | 4/1996 | Sagi .................. | B62K 13/06 280/209 |
| 6,022,036 | A | * | 2/2000 | Chartrand .......... | B62K 13/06 280/209 |
| 2014/0070513 | A1 | * | 3/2014 | Teerlink ............ | B62K 3/12 280/209 |

* cited by examiner

*Primary Examiner* — Kevin Hurley
*Assistant Examiner* — Marlon A Arce
(74) *Attorney, Agent, or Firm* — Eugenio J. Torres-Oyola; Victor Rodriguez-Reyes; Ferraiuoli LLC

(57) ABSTRACT

Various embodiments of side-by-side flexible adjacent vehicles, such as twin bikes, are disclosed including includes two vehicles joined together side-by-side by means of a plurality of interconnecting pivoted link bars. One or more driver riders may simultaneously or independently operate said side-by-side flexible adjacent vehicles. The side-by-side flexible twin bicycle may be configured employing different size bicycles, in-line multi-rider tandem bicycles, recumbent bicycles, mountain bicycles, and motorcycles of various types. These embodiments provide the vertical stability of a four-wheel vehicle while retaining the ability to lean into turns and ride over irregular surfaces affording for each of the riders the handling, ride and feel similar to that of a single conventional vehicles.

13 Claims, 22 Drawing Sheets

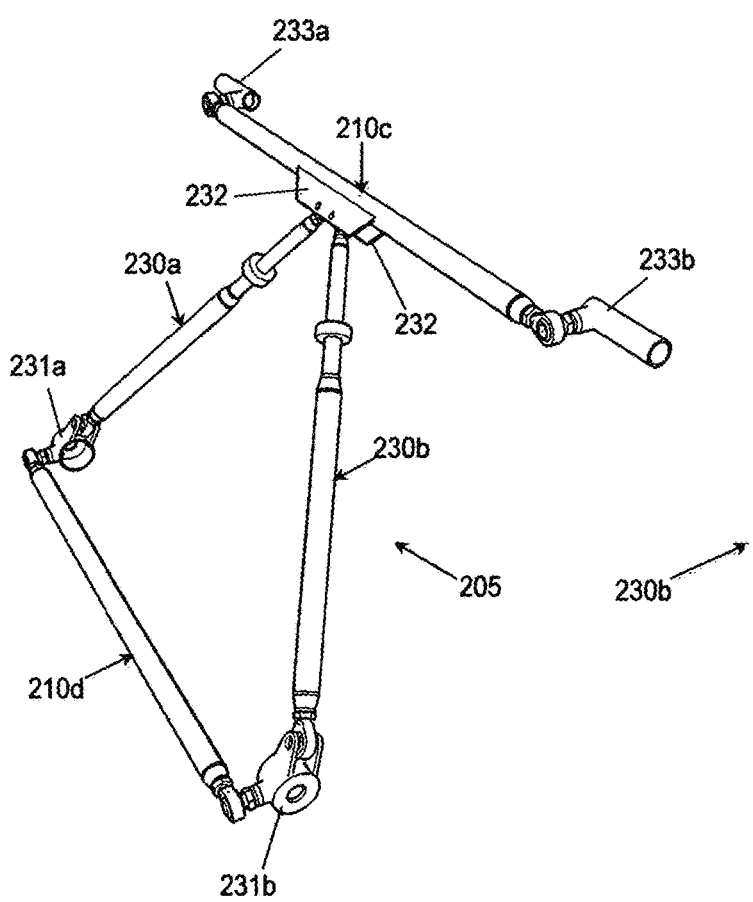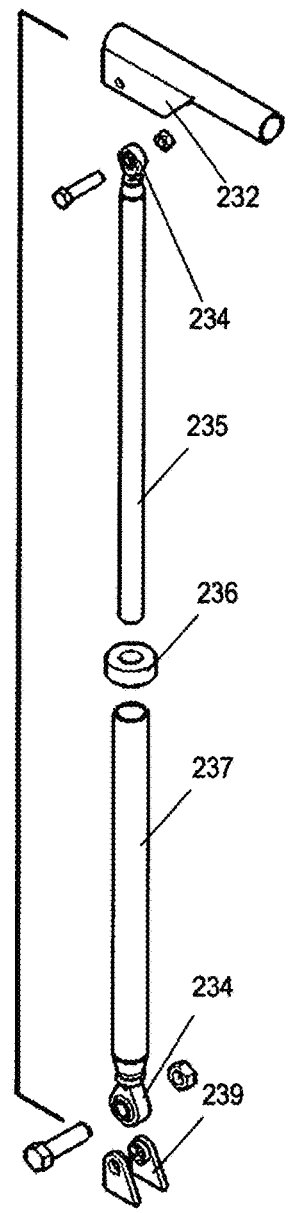
FIG. 2C
FIG. 2D

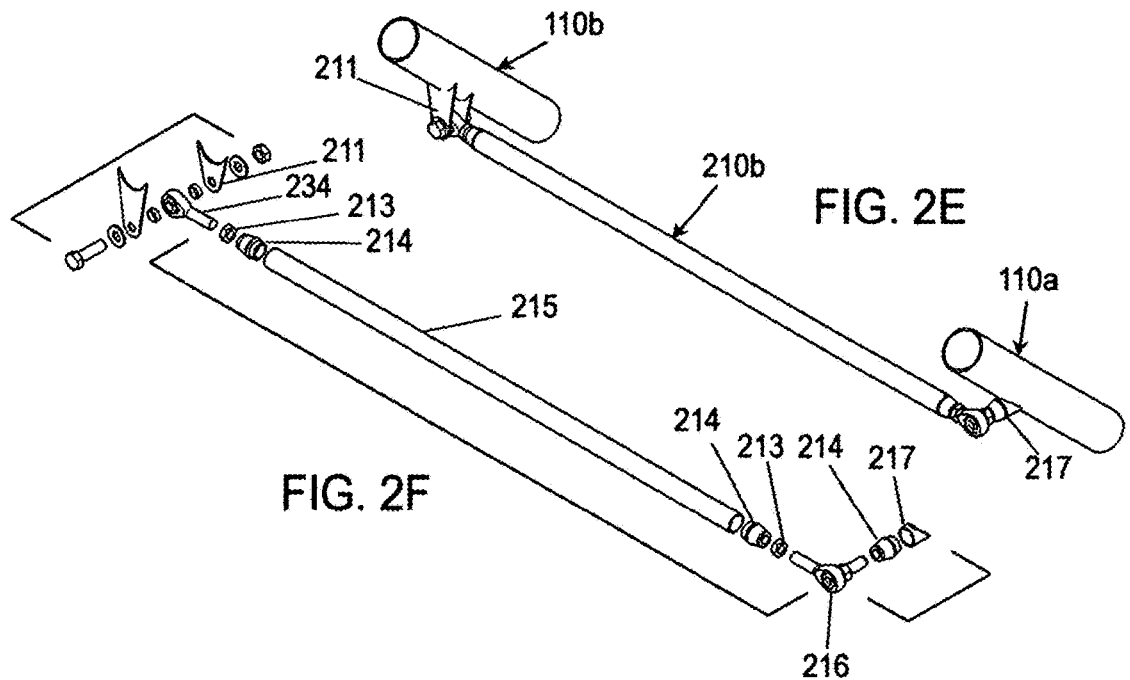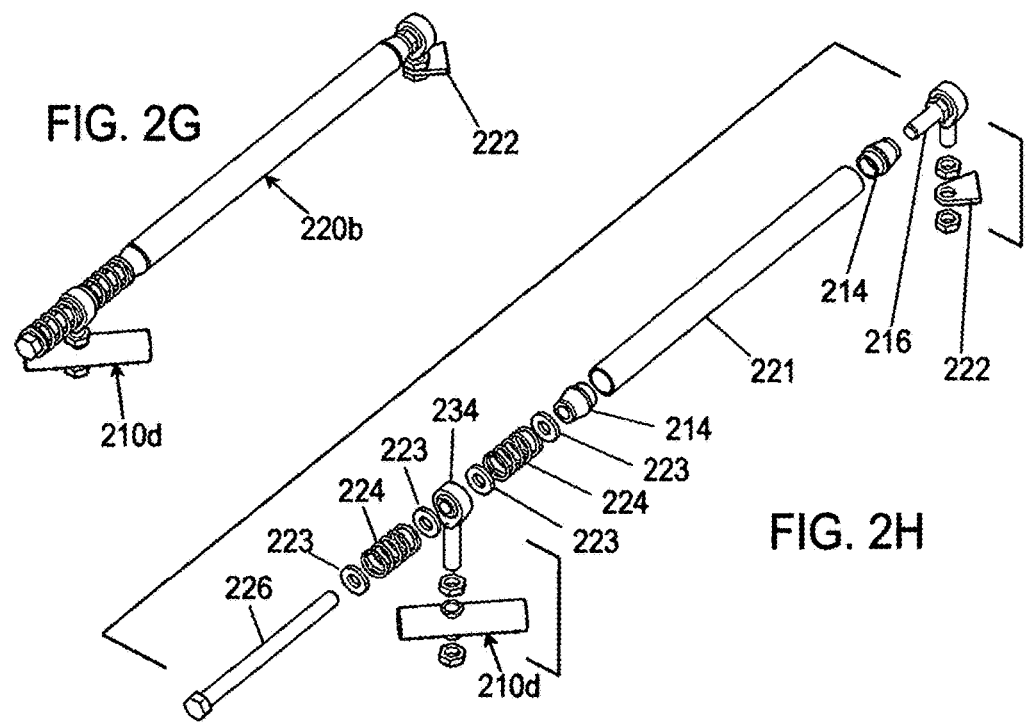

SIDE-BY-SIDE FLEXIBLE TWIN BICYCLES

STATEMENT REGARDING FEDERALLY SPONSORED RESEARCH AND DEVELOPMENT

N/A

RELATED APPLICATIONS

This application claims the benefit of priority of U.S. Non-provisional application Ser. No. 14/450,268 filed Aug. 3, 2014.

BACKGROUND OF THE DISCLOSURE

Development of the Side-by-Side Flexible Twin Bicycle

Bicycling is an efficient means of transportation and one of the easiest ways to exercise with many health benefits including improvement in cardio-vascular fitness and stamina. But bicycling is not free of dangers.

According to Schwab (2012) "A quarter of all fatalities and half of all seriously injured in traffic in the Netherlands are bicyclists, more alarming is that in the last 10 years the number of seriously injured bicyclists is steadily increasing. This increase is for a large part among the elderly, where the types of accidents are so-called single vehicle accidents. The bicyclist is not hit by a car or a bus, he just falls over. One aspect of this falling over can be attributed to the stability of the vehicle, the bicycle."

As an alternative to overcome this safety concern, in December 2012, I joined two Schwinn® Drifter 26" bicycles (one man, one woman) rigidly side-by-side in parallel. The resulting side-by-side rigid twin bicycle is similar to what is known as a "Quadracycle".

The benefits of riding a side-by-side rigid twin bicycle include the vertical stability that reduces the likelihood of falls, dual steering controls that can be shared or alternated between riders, the ability of one rider to pedal or apply brakes while the other rests, and most enjoyable, the social ability to hold a conversation while pedaling at a leisure pace.

However, the side-by-side rigid twin bicycle has also the constraints and limitations of the quadracycle. Quadracycles, ("All about bicycles," n.d.) "have some stability issues, and it is not usually advised to take corners at superior speeds. The passengers need to shift their weight in order to keep the vehicle on the road." This stability issue while cornering is related to the quadracycle's inability to lean into turns as regular bicycles do.

Another limitation of quadracycles is that they ride best in a straight line and on even and level surfaces. When turning into a surface of different elevation or inclination, for example when going from the road into an inclined carport ramp, if the approach to the ramp is at an angle, the quadracycle will ride on three tires over the transition. When one tire looses contact with the ground, due to the differences in elevation or inclination, the quadracycle frame to undergo bending and twisting stresses that can compromise its integrity and eventually result in failure due of metal fatigue.

In August 2013, not satisfied with the limitations of the side-by-side rigid twin bicycle, I started design of various mechanisms for joining the two bicycles in a flexible manner to avoid the limitations of the rigid quadracycle and allow each bicycle to lean into turns and to pitch and surge to conform to bumps or hollows and differences in elevation in its path, while retaining the vertical stability of the side-by-side rigid twin bicycle.

During September 2013 I developed various design geometries in a 3D CAD program for connecting two bicycles in parallel with pivoted link bars. I selected four horizontal link bars with spherical rod end bearings to connect the two bicycle frames in such a way as to form a flexible box type assemblage with the objective of minimizing deviations of the bicycle frames from parallel. The spherical rod end bearings are commercially available at various sizes and configurations and are used when a precision articulating joint is required.

The initial 3D CAD design effort also included the use of longitudinal torsion bars, compound torsion bars, or vertical diagonal compression springs mounted on concentric tubes to maintain the flexible side-by-side twin bicycle assemblage upright when at rest and still allow for lean, pitch and surge while riding.

I desired to locate the link bar pivot points as near as possible to each bicycle frame centerline. This was to form, in front view, a rectangle with pivoting corners that would fold into a parallelogram, reasoning that said assemblage would not impose bending stresses on the bicycle frames when it leaned into a turn or when it was twisted around the transverse axis when riding over uneven surfaces. Two of the link bars would be located on the front attached at the top and bottom of the head tube of each bicycle. The other two link bars were located at the rear; one connecting seat tubes near the base of the seats, and the other near the rear wheels hubs. The pivot points of the rear bottom link bar had to be located away from the centerline of the frame to clear the wheel hub and chain mechanism and it was not clear if this deviation from the vertical center plane was possible without introducing bending or twisting stresses on the bicycle frames.

To verify the effect of locating the rear bottom link bar pivots away from the vertical center plane I did graphic simulation of the motions in the 3D CAD program. This simulation consisted of leaning, rotating and moving each CAD model bicycle and then rotating the links on the vertical and horizontal planes centered on one of the pivot points to move the other end of the link as near as possible to its initial pivot point on the other bicycle. This simulation proved to be difficult due to the complexity in motion of the different components in 3D.

I found that, after completing a number of iterations, there was always an error in that at least one end of one of the link bars would not fall exactly on its corresponding pivot point. This meant that on an actual assemblage, when said assemblage was leaned into a turn, each of the four link bars would be either in tension or compression. This would impose bending and twisting stresses on each bicycle frame that could eventually result in metal fatigue failures. This is probably one of the reasons why, to my knowledge, there is no functionally successful side-by-side flexible twin bicycle prior art.

As I continued development of the concept I discovered several other reasons why prior art may have also failed, these reasons are discussed later.

To overcome said twisting and bending problem I initially considered mounting one or more link bars with pivot points supported on compression springs to allow the pivot point to move against the springs and relieve some of the tension or compression force to reduce the frame bending or twisting stresses to acceptable levels. But this represented an undesirable mechanical complexity and the uncertainty that the assemblage would not maintain proper alignment under all lean, pitch and surge motions. The construction of pivot points mounted with compression springs is discussed in the detailed description section of the present document related to FIGS. 2g and 2h that describe the horizontal diagonal link bars 420a and 420b.

I came up with conclusion that if the four pivot points of each bicycle frame were located on the same plane, a plane not necessarily on the bicycle frame centerline, independent of the resulting difference between link bar lengths, it might reduce or eliminate the error that at least one link bar end would not fall exactly on its corresponding pivot point. The pivot point plane of each bicycle on said assemblage would look like an inclined "V" shape both in front view and in top view. If said hypothesis was true there would be no bending or twisting stresses imposed on the bicycles frames when said assemblage was leaned into a turn or when it rode over an uneven path.

In October 2013 I built a ⅝-scale wood model employing ¼" spherical rod end bearings to test said hypothesis and found that, although the motions of the assemblage were very complex, the ⅝-scale wood model could be folded around the longitudinal axes of the pivot points until it collapsed flat and could also be twisted around the transverse axis of the assemblage to the limit afforded by the spherical rod end bearings without appreciable resistance. This test confirmed the hypothesis a coplanar pivot point geometry, that is, all pivot points of each bicycle frame located on an inclined plane, independent of the difference between link bar lengths, avoided the introduction of bending and twisting stresses on the bicycles frames. Details of the ⅝-scale wood model construction and the twisting and folding tests are explained in the detailed description of example embodiments.

From November 2013 to January 2014 I fabricated the components to modify the two rigid bicycles into a side-by-side flexible twin bicycle assemblage following coplanar pivot point geometry. Instead of using four link bars as originally planned I used three by substituting the two front link bars on the head tube with one link bar in the middle of the head tube. The reasoning for this change was that three points in space always define a unique plane; the pivot points on three links would always fall on the same plane independent of errors in fabrication.

I started testing of the first prototype early in February 2014 and immediately encountered two problems that rendered the assemblage unrideable. The first problem was progressive misalignment and excessive scrubbing of the front tires even when attempting just to run on a straight line. I initially attributed this to misalignment of the bicycle frames but, after several trials adjusting the length of the link bars to improve the alignment, I realized that this problem was due to twisting of the bicycle frames. The details of this problem are explained in the detailed description of example embodiments. I replaced the single front link bar on the head tube with two link bars, one installed above the top tube and the second below the bottom tube. These two link bars provided enough rigidity to reduce the twisting of the frames to be essentially imperceptible.

The second problem was related to the use of springs mounted on concentric tubes intended to maintain the flexible assemblage upright when at rest but allow for leaning into turns. I found that these springs interfered with the ability to lean into turns and maintain a constant turn radius. I also found that, after removing the springs, the turning behavior of the assemblage was similar to that of a standard single bicycle. Difficulties with springs intended to maintain the flexible assemblage and riders upright when at rest and while riding in a straight line will be explained later in the detailed description section. Essentially all previous art employs springs for this purpose and this is probably another reason why previous art has not been successful.

I refer to the modified assemblage with the four link bars and without springs as the second prototype. I started testing the second prototype early in March 2014 and found that it satisfied the performance conditions desired. The second prototype of the Side-by-Side Flexible Twin Bicycle maintains the benefits of the original rigid side-by-side twin bicycle while avoiding the constraints of the rigid quadracycle. The flexible attribute refers to the ability of the assemblage to be simultaneously or independently operated by one or more driver riders and, while providing the vertical stability of a four-wheel vehicle, allow for the simultaneous leaning in order to enter, execute and exit from turns in a manner similar to riding a typical single bicycle; allows for pitching around the transverse axis to conform to bumps or hollows in the riding path of each bicycle and allows for the independent vertical surge of each bicycle to conform to differences in elevation in the riding path while maintaining a relative parallel position between each bicycle.

BACKGROUND

Prior Art

According to Pressman (2012), "more patents issue on bicycles than anything else". Judging from the number of patents in the prior art cited below, there has been an intense interest for over a century to develop a viable side-by-side parallel twin bicycle. Multiple designs of rigid and semi rigid assemblies have been proposed, some with the ability to roll around the longitudinal axis, others with the ability to rotate or pitch around the transverse axis and yet others with the ability to allow for vertical surge of each bicycle.

There is a smaller number that have claimed the ability to combine the movements of roll, pitch and surge in one embodiment.

Notwithstanding the number of designs for side-by-side flexible twin bicycles proposed, the lack of a successful, commercially viable flexible twin bicycle with the ability to combine the movements of roll, pitch and surge in one embodiment hints at a number of shortcomings inherent in those designs that to our knowledge have not been overcome by anyone of the previous designs proposed.

The related prior art comprises several shortcomings evident upon close examination of the figures and the corresponding description of the operation. For example, the "unintentional rigid assemblage" in Riess (U.S. Pat. No. 469,722) relates to torsion springs located in the middle of otherwise unpivoted link bars and the "unintentional rigid assemblage" in Pomerance (U.S. Pat. No. 3,836,401) is due to a rigid link bar to coordinate the steering of the two bicycles that is connected directly to the inside tips of the center hub of the front tires. The Pomerance arrangement results in an unsteerable assemblage since when a bicycle is steered the tips of the hub of the front tire follow arc trajectories in opposite directions that that rigid link bar would not allow.

Other shortcomings are not evident and were discovered after several attempts to correct related problems during testing of the first prototype. Identifying the root cause of the problem required some additional testing, close observation and modifications. One example is the longitudinal flexing and twisting of individual bicycle frames due to lateral loads from road-induced deformation of tires. I experienced this problem when testing the first prototype and initially attributed it to misalignment of the bicycles. But after several efforts to get the alignment right failed to resolve the problem I concluded that misalignment was an aggravating factor but not the root cause.

This problem was related to the use of a single link bar on the front of the first prototype that, in combination with the two bicycle frames, did not provide the rigidity anticipated. Bicycle frames are triangulated tubular structures that are extremely strong resisting vertical loads. A sudden lateral force on a single bicycle results in falling to the side and is promptly corrected by the rider by "steering into the fall". The resulting lateral stress on the frame of that single bicycle is not significant. This is not the case when two bicycles are joined together in parallel.

When two bicycles are joined together in parallel the reaction to lateral forces is not that clear since the system is designed "not to fall" and each frame can induce stresses on the other. It seems that all inventors, I included, unconsciously assumed that the structure would be relatively rigid and exposed to minimal lateral forces. That is not the case as will be explained later in the discussion of the operation of the first prototype.

There are prior art embodiments that employ a single link element at the front, for example Chin et al. (U.S. Pat. No. 8,146,937), and it is claimed this maintains perfect parallel position when the horizontal (lateral) bending torques from the auxiliary tire would probably bend and deform the single link element at the pivot points. There are embodiments with two link elements, one at the front, the other at the rear, for example Underhaug (U.S. Pat. No. 7,669,868), Pomerance, Ferrary (U.S. Pat. No. 3,350,115), that are also claimed to maintain perfect alignment, but the bending torques around the longitudinal axis formed by the pivot points of said link elements combined with the lever arms from the longitudinal axes to the contact points of the tires with the road, will probably tend to bend and twist the individual frames and spread or narrow the track of said assemblies.

Another unobvious shortcoming discovered during prototype testing relates to the turning behavior of embodiments that employ springs or other resilient ("sprung") components to keep the assemblage and riders in a vertical position while "allowing for leaning into turns and to accommodate for bumps or differences in road elevations." The behavior of these sprung embodiments is not as I had anticipated. This will be explained later in the section discussing the operation of the first and second prototypes.

In summary, based on the experience gained while developing and testing the first and second prototypes of my side-by-side flexible twin bicycle embodiment, I have concluded that several of the previously proposed prior art embodiments listed in table 1 suffer from a number of limitations, disadvantages or shortcomings that result in not meeting the attributes claimed by the inventors. Some of said limitations, disadvantages and shortcomings are related to:

a. Mechanical complexity that may introduce too much play between components and results in undesirable twisting and misalignment of the embodiment.

b. Mechanical complexity that requires complex fabrication methods and result in relatively heavy assemblies.

c. Link geometry pivot points that when the assemblage is attempted to be leaned and turned into corners would result in a rigid not a flexible structure as claimed.

d. Embodiment assemblage structures that introduce repetitive bending and/or twisting stresses to each bicycle frame and the assemblage components. These stresses can eventually result in permanent deformation and/or metal fatigue and failure of said stressed frames and components.

e. Some of the proposed designs employ springs intended to maintain the assemblies plus riders in an upright position while at rest and while riding on a straight path and simultaneously allowing for flexibility to lean into turns and to accommodate varying road conditions. I found that the sprung assemblies do not necessarily behave as claimed by the inventors under said turning or varied road conditions.

f. Vertically unstable assemblies that, while accelerating, turning or braking, could result in potentially dangerous overturning conditions, contrary to the inherently safe design claimed by the inventors.

Some of the specific limitations, disadvantages and shortcomings of the relevant prior-art listed above are explained within the detailed description of example embodiments.

SUMMARY

The subject Side-by-Side Flexible Twin Bicycle is an innovative, effective and relatively safe embodiment that has been demonstrated to have the ability to lean into turns and ride over irregular surfaces affording each of the riders the handling, ride and feel similar to that of a single conventional bicycle while providing the stability of a four-wheel vehicle.

BRIEF DESCRIPTION OF THE DRAWINGS

FIG. 2C shows a perspective view of the rear link bar subassembly including the left and right vertical diagonal bars located between the rear top link bar and the rear bottom link bar in accordance with the principles of the present disclosure.

FIG. 2D shows the right vertical diagonal bar of FIG. 3C in exploded view in accordance with the principles of the present disclosure.

FIG. 2E shows a perspective view of typical pivoted link bar with examples two types of connectors in accordance with the principles of the present disclosure.

FIG. 2F shows the typical pivoted link bar and connectors of FIG. 3B in exploded view in accordance with the principles of the present disclosure.

FIG. 2G shows an example of one horizontal diagonal link bar in perspective view in accordance with the principles of the present disclosure.

FIG. 2H shows the horizontal diagonal link bar of FIG. 3D in exploded view in accordance with the principles of the present disclosure.

DETAILED DESCRIPTION—FIGS. 1, 2A, 2B, 2C, 2D, 2E, 2F, 2G, and 2H

Various aspects described or referenced herein may be directed to different embodiments of an inventive side-by-side flexible twin bicycle having various features as illustrated and described and/or referenced herein.

Figure 1:
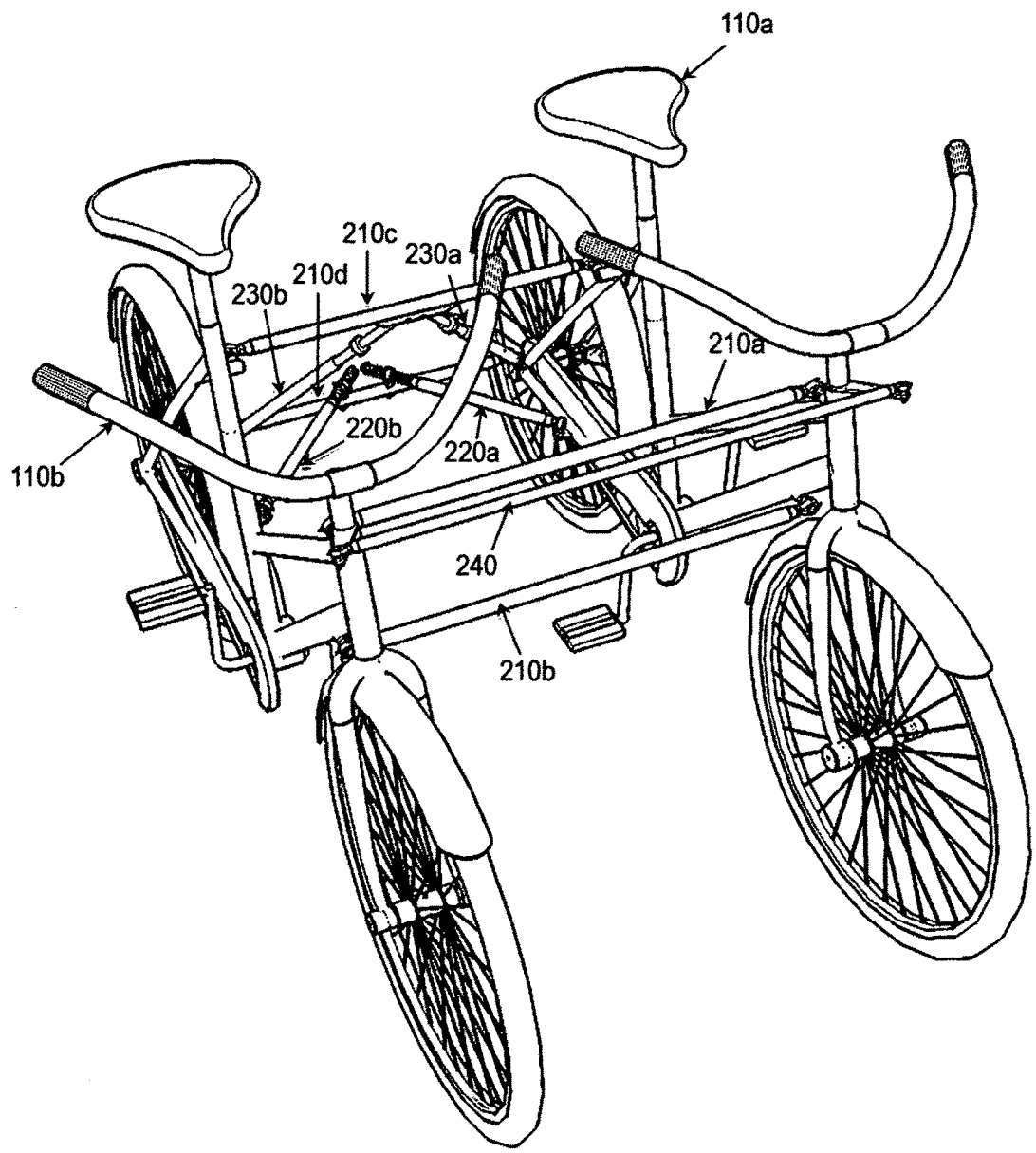
FIG. 1 shows a perspective view of a first embodiment of the side-by-side flexible twin bicycle in accordance with the principles of the present disclosure.

One first exemplary embodiment of the side-by-side flexible adjacent vehicles such as twin bicycles is shown in FIG. 1 in front perspective view as assembled in the second test prototype. Four link bars connect the left side bicycle 110a and the right side bicycle 110b of this embodiment. Said link bars are the upper front link bar 210a, the lower front link bar 210b, the upper rear link bar 210c, the lower rear link bar 210e. The assemblage is also comprised of the steering link bar 240, the left and right horizontal diagonal link bars 220a and 220b respectively, and the left and right vertical diagonal bars 230a and 230b respectively.

Figure 2A:
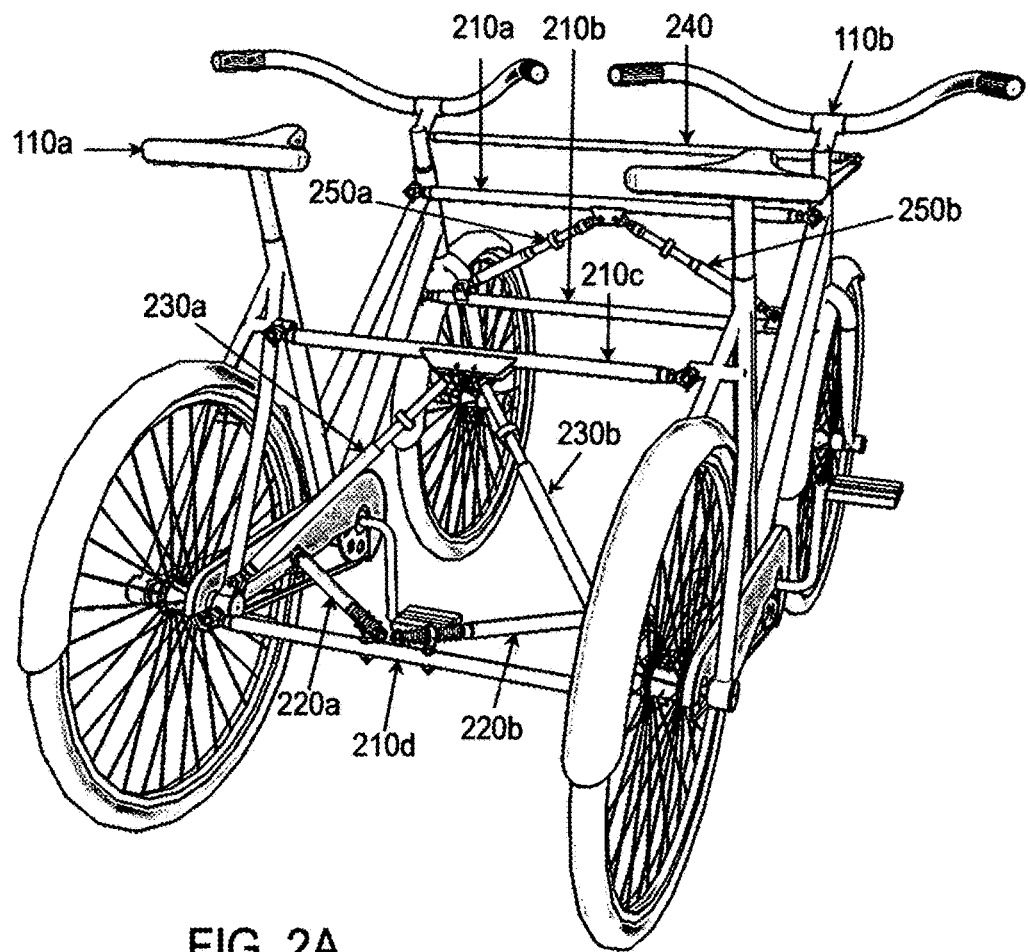
FIG. 2A shows a rear perspective view of another embodiment of the side-by-side flexible twin bicycle further including front diagonal bars located between the front top link bar and the front bottom link bar in accordance with the principles of the present disclosure.

FIG. 2A shows a rear perspective view of an embodiment of two bicycles connected side-by-side in parallel similar to FIG. 1 with the exception of extra front left and right vertical diagonal bars 250a and 250b respectively attached to the upper front link bar 210a and the lower front link bar 210b.

Figure 2B:
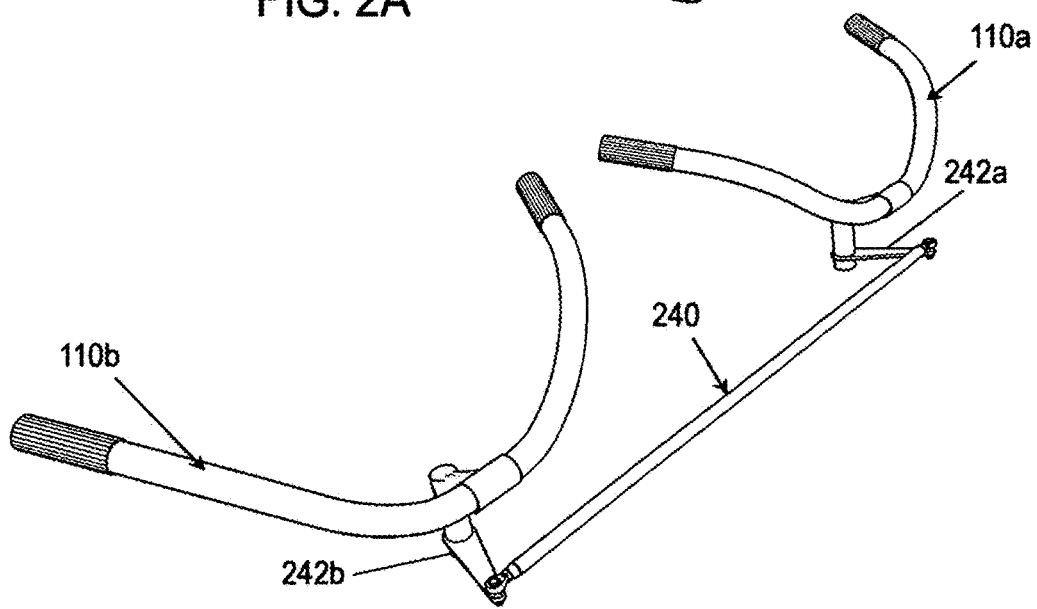
FIG. 2B shows a perspective view of the steering link bar assemblage in accordance with the principles of the present disclosure.

FIG. 2B shows a perspective view of the steering mechanism composed of link bar 240, the left steering pivot arm 242a attached to the handlebar stem of the left side bicycle 110a, and the right steering pivot arm 242b attached to the handlebar stem of handlebar of the right side bicycle 110b. Said figure shows only the respective bicycles handlebars for clarity.

FIG. 2C shows a perspective view of an example of a rear link bar subassembly 205 consisting of the left vertical diagonal bar 230a, the right vertical diagonal bar 230b that are pivotally attached to the upper rear link bar 210c via the vertical diagonal bar support tabs 232, and pivotally attached to the left and right rear bottom link bar support assemblies 231a and 231b respectively that are in turn attached to the rear wheel axle bolt of the left and right bicycles 110a and 110b respectively. Said left and right rear bottom link bar support assemblies 231a and 231b also support the lower rear link bar 210d. An alternate embodiment not shown in FIG. 2C would have the bottom pivoted ends of the left vertical diagonal bar 230a and the right vertical diagonal bar 230b connected to the lower rear link bar 210d in a similar fashion as the extra front left and right vertical diagonal bars 250a and 250b that are attached to the upper front link bar 210a and the lower front link bar 210b as shown in FIG. 2A. FIG. 2C also shows the rear left and right top link bar supports 233a and 233b that are attached near the seat tubes of the left and right bicycles 110a and 110b respectively.

FIG. 2D shows an exploded view of the right vertical diagonal bar 230b. Said vertical diagonal bar subassembly is composed of the vertical diagonal bar support tabs 232, the spherical rod end bearings 234, the inner concentric tube 235, the shaft collar 236, the outer concentric tube 237 and the lower support tabs 239 that are attached to the left and right rear bottom link bar support assemblies 231a and 321b. The left vertical diagonal link bar 230a and attachments is a mirror image of the right horizontal diagonal link bar 230b.

FIG. 2E shows a perspective view of an example of a typical link bar subassembly, in this case the lower front link bar 210b, with an example of link bar support tabs 211 on the right side attached to the down tube of bicycle 110b, and an example of a link bar support bushing 217 on the left side attached to the down tube of bicycle 110a. Said figure shows only a section of the down tubes to represent each bicycle for clarity. The link bar supports, tabs 211 and bushing 217, are shown attached to the underside of the down tube of each bicycle as examples of pivoted joint attachment methods. Alternatively, both front link bars can be attached to the front of the head tube of each bicycle for example by means of bushing 217 attachments.

FIG. 2F shows an exploded view of the lower front link bar 210b subassembly of FIG. 2E. The lower front link bar 210b subassembly is composed of spherical rod end bearings 234, locknuts 213, threaded inserts 214 that are attached to each end of link bar tube 215, and spherical rod end bearing with threaded lug 216.

FIG. 2G shows a perspective view of the right horizontal diagonal link bar 220b subassembly with link bar support tab 222 that is attached on the front end to the chain stay tube of bicycle 110b and on the rear end near the middle of the lower rear link bar 210d. The left horizontal diagonal link bar 220a subassembly and attachments is a mirror image of the right horizontal diagonal link bar 220b subassembly. FIG. 2G shows only a section of the lower rear link bar 210d for clarity.

FIG. 2H shows an exploded view of the right horizontal diagonal link bar 220b subassembly of FIG. 2G, with the link bar support tab 222 and the lower rear link bar 210d. The horizontal diagonal link bar 220b subassembly is composed spherical rod end bearing centering bolt 226, spring retaining washers 223, spherical rod end bearing centering springs 224, spherical rod end bearing 234, threaded inserts 214, link bar tube 221, and spherical rod end bearing with threaded lug 216. FIG. 2H shows only a section of the lower rear link bar 210d for clarity.

Operation—FIGS. 1, 2A, 2B, 2C, 2D, 2E, 2F, 2G and 2H

The manner of operation of the side-by-side flexible twin bicycle embodiment is similar to the operation of a single standard bicycle. The link bars 210a, 210b, 210c and 210d in FIG. 1, in combination with the attachment points on the frames of bicycles 110a and 110b, conform a cuboid with articulating joint connectors at each of the eight pivoted vertices. Said pivoted cuboid shape arrangement allows the bicycles to lean sideways to conform into a front view parallelogram that can eventually collapse flat in a similar fashion as when a single bicycle falls on its side.

The function of the vertical diagonal bars 230a and 230b is to limit the maximum sideways inclination of the assemblage and prevent said flat sideways collapse. Vertical stability of the assemblage is provided by each bicycle rider combination acting, in synchrony with link bars 210a, 210b, 210c and 210d and the left and right vertical diagonal link bars 230a and 230b, as a counterweight to the other bicycle rider combination to reduce the likelihood of lateral falls.

The key element for the correct functioning of said assemblage, that is not evident from previous art, to allow for free rotation of said assemblage while maintaining accurate alignment of the different components and avoid imposing undesirable bending and torsional stresses on the structure, is the use of precision articulating joint connectors that, as will be explained later, have to be accurately located on the same planes.

There are alternative precision articulating joint connectors and several examples will be discussed later in the alternate pivoted joint embodiments section. For purposes of the present discussion the side-by-side flexible twin bicycle assemblage is illustrated with spherical rod end bearings 234 or 216.

The spherical rod end bearing is a mechanical articulating joint that allows for free rotation around the main rotation axis, that is, the centerline of the attachment bolt that passes through the center of the spherical rod end bearing sphere. The spherical rod end bearing also allows for limited rotation perpendicular to said main axis to accommodate for misalignment. A variety of spherical rod end bearings are commercially available with right and left hand treads to allow for adjustment of the rod length, and with factory installed threaded lugs as an option.

The link bars 210a, 210b, 210c and 210d maintain the parallel longitudinal alignment of the two bicycles 110a and 110b and allow for small adjustments in length of the link bars for fine tuning of said parallel alignment. Making reference to FIG. 2E and FIG. 2F, the fine tuning of the parallel alignment is possible without the need to disconnect the link bar by using a left threaded spherical rod end bearings 234 or 216, lock nuts 213 and threaded inserts 214 on one end of the bar, and right threaded spherical rod end bearings 234 or 216, lock nuts 213 and threaded inserts 214 on the other end of said link bar. The length of the particular link bar is fine tuned by loosening the lock nuts 213, rotating the link bar tube 215 and attached threaded inserts 214 to obtain the desired length and tightening the lock nuts 213 to lock the spherical rod end bearings 234 in the new position.

The link bars 210a, 210b, 210c and 210d are preferably attached to the bicycle frames in such a manner that the spherical rod end bearing main rotation axis is as near as possible to horizontal to avoid potential for binding and damage to the spherical rod end bearing when the assemblage leans sideways. The center of the spherical rod end bearing sphere is preferably located at the vertical center plane of the bicycle frames to minimize a reduction in the track when said assemblage leans to the side.

The limited rotation of the spherical rod end bearing perpendicular to the axis of the attachment bolt allows for rotation around the axis defined by the centerline of the link bar. The rotation around the centerline axis of link bars 210a, 210b, 210c and 210d, in synchrony with the rotation around the spherical rod end bearing main rotation axis, allows each bicycle to rotate or pitch around the transverse axis of the assemblage to conform to differences in bumps or hollows on each individual bicycle riding path as will be explained in more detail later under the Coplanar Pivoted Joints section.

The steering mechanism pivot arms 242a and 242b are attached to the handlebar stems in an angle that conforms to Ackerman steering geometry enabling said assemblage to be steered as a unit. Ackermann steering geometry is a geometric arrangement of linkages in the steering of a vehicle designed to solve the problem of wheels on the inside and outside of a turn needing to trace out circles of different radius. The steering link bar 240 length can be varied, as explained earlier in relation to link bars 210a, 210b, 210c and 210d, to fine-tune the assemblage steering alignment.

Making reference to FIG. 2C and FIG. 2D, the vertical diagonal bars 230a and 230b limit the maximum sideways inclination or lean of the assemblage by allowing the inner concentric tube 235 to slide into the outer concentric tube 237 until the shaft collar 236 that is securely attached to the inner concentric tube 235 makes contact with the top of the outer concentric tube 237. The shaft collar 236 position on the inner concentric tube 235 is adjustable to set the maximum lean angle of the assemblage based on rider style and preferences. Shaft collar 236 can be a commercially available clamping style shaft collar.

The lean angle of a bicycle in a turn is a function of the bicycle speed and radius of said turn, defined by rider style and preferences, as will be explained later under the Operation—Use of Vertical Diagonal Springs, Balance of the Lateral Forces Acting on a Bicycle section.

Setting the shaft collar 236 position on the inner concentric tubes 235 of both vertical diagonal bars 230a and 230b to the lowest position, that is, in contact with the top of the corresponding outer concentric tubes 237, will conform bars 230a, 230b and link bar 210d into a rigid triangle that will result in a rigid assemblage similar to a quadracycle but, contrary to the typical completely rigid quadracycle, the resulting assemblage will retain the ability to rotate or pitch around the transverse axis of the assemblage rear tires to conform to differences in bumps or hollows on each individual bicycle riding path.

The limited rotation of the spherical rod end bearing perpendicular to axis of the attachment bolt also allows for rotation around the vertical axis of the spherical rod end bearing sphere which results in undesirable surging forward of the individual bicycle in relation to the other bicycle when accelerating or lagging behind of the individual bicycle in relation to the other bicycle when braking.

The surging forward or lagging behind motion of one bicycle, if not limited to small displacements, would have two undesirable effects. First, it would allow the bicycles to move into a top view parallelogram that will reduce the track or separation distance between each bicycle. Second, it would reach the limit of the misalignment allowed by the spherical rod end bearings 234 and impose bending stresses on both the spherical rod end bearings 234, the link bars 210a, 210b, 210c and 210d, the pivoted point attachments to the bicycle frames attachment and the bicycle frames themselves that could eventually result on damage and metal fatigue failure of any of those components.

Making reference to FIG. 1, FIG. 2A, FIG. 2G and FIG. 2H, the horizontal diagonal link bars 220a and 220b dampen and limit said undesirable surging forward or lagging behind of individual bicycles to small displacements by forming semi-rigid triangles with the inner chain stay tube of each bicycle and the rear bottom link bar 210d. Rigid triangles that would prevent even small surging or lagging displacements would be formed if the horizontal diagonal link bars 220a and 220b were not fitted with compression springs 224 and instead the spherical rod end bearings 234 locations were fixed on said diagonal link bars. Said rigid triangles would result in undesirable repetitive peak bending forces imposed on the inner chain stay tubes of each bicycle and on the rear bottom link bar 210d imposed during acceleration or braking that could eventually result in metal fatigue failures. This is an example of spring mounted link bars cited earlier in the Background—Development of the Side-by-Side Flexible Twin Bicycle section that were considered to overcome the twisting and bending of frames problem.

Forces from pedaling that cause the surging forward motion of each bicycle in relation to the other are limited by the strength the rider. According to Wilson (2004), "When a rider briefly exerts a force more than [ . . . ] that needed for propulsion, there results a brisk acceleration of the system mass. Wilson (on *Bicycle science* 3rd Ed) explains, "The mass is so large that even a "brisk" acceleration is never very great" (page 123). According to Wilson's estimates a braking deceleration in the order of 0.5 g is the maximum that "can be risked by a crouched rider on level ground before he risks going over the handlebars" and 0.8 g is the maximum theoretical braking deceleration for tandem or recumbent bicycles (page 245). Thus it is the braking forces that impose the larger bending forces on the inner chain stay tubes of each bicycle and on the rear bottom link bar 210d.

The sprung subassembly comprised of the spherical rod end bearing centering bolt 226, spring retainer washers 223 and compression springs 224, allows the spherical rod end bearing 234 to slide on the spherical rod end bearing centering bolt 226 to dampen the forces resulting from surging or lagging due to differences in acceleration or braking forces between each bicycle extending the duration and reducing the peak intensity of said the forces to reduce the bending stresses on the inner chain stay tube of each bicycle and the rear bottom link bar 210*d* to acceptable levels.

An alternative embodiment of a subassembly to coordinate the braking of both bicycles and reduce the difference in deceleration between bicycles that causes the lagging behind force is explained later under the detailed description of the Combined Brakes embodiment section.

Pivoted Joints Geometry Considerations—FIGS. 3A, 3B, 3C, 3D and 3E

Coplanar Pivoted Joints

Figure 3A:
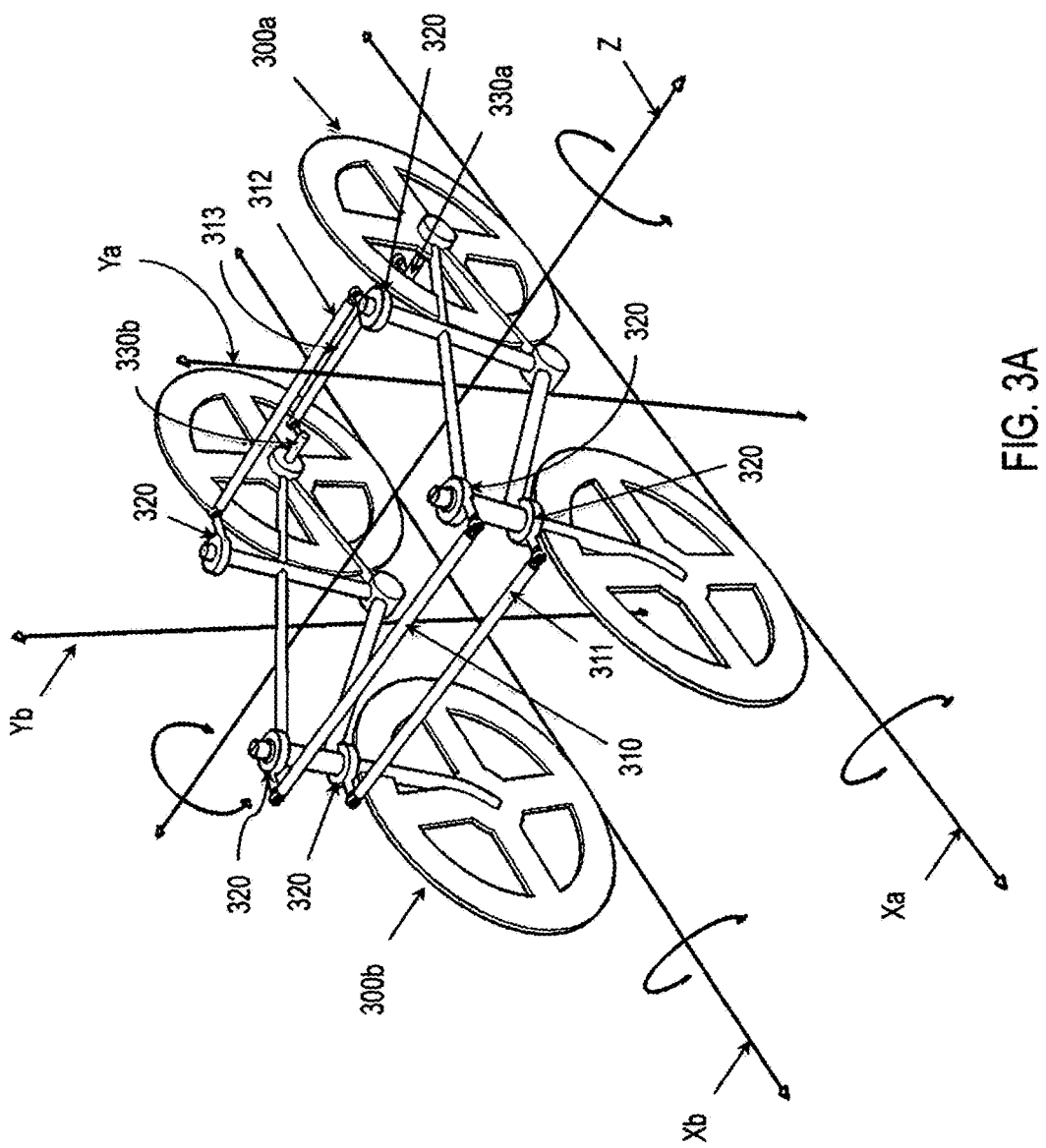
FIG. 3A shows the perspective view of a side-by-side flexible twin bicycle assemblage including the reference axes to describe linear and rotational movements of said assemblage in accordance with the principles of the present disclosure.

FIG. 3A shows a perspective diagram of a first embodiment Side-by-Side Flexible Twin Bicycle assemblage. Said first embodiment consists of the left bicycle 300*a*, the right bicycle 300*b*, the front top link bar 310, the front bottom link bar 311, the rear top link bar 312, the rear bottom link bar 313, six adjustable collars 320, and the adjustable rear bottom link bar left support 330*a* and the adjustable rear bottom link bar right support 330*b*.

The articulating joint connectors employed on the Side-by-Side Flexible Twin Bicycle assemblage are small spherical rod end bearings with threaded lugs that are threaded directly into the ends of the link bars and to the adjustable collars.

The link bars 310, 311, 312 and 313 in FIG. 3A in combination with the right bicycle 300*a* and the left bicycle 300*b* conform a cuboid with a spherical rod end bearing at each of the eight vertices.

The spherical rod end bearing are attached to the dowels to form the link bars and the link bars are attached to the collars 220. The collars 220 are secured in position on the frame. The rear bottom link bar supports 230*a* and 230*b* are secured in place. The studs of the rear bottom link bar 213 are perpendicular to the side of the rear bottom link bar supports 230*a* and 230*b*.

The location of the pivoted joints can be fine tuned to be coplanar through several adjustments to the first embodiment. The length of the four link bars 310, 311, 312 and 313 is adjustable by threading in or threading out the corresponding spherical rod end bearings. The position of the rear bottom link bar supports 330*a* and 330*b* is adjustable by displacing the dowel in or out of the rear wheel hub. The collars 220 are adjustable by moving up or down and by rotating on their center axis.

FIG. 3A shows the collars 220 corresponding to the upper front link bar 210 with dowels displaced to the outside of each frame, the collars 220 corresponding the lower front link bar 211 with dowels displaced to the inside of each frame, and the collars 220 corresponding the upper rear link bar 212 with dowels displaced to the inside of each frame.

FIG. 3A also shows the longitudinal rotation axis Xa of the left bicycle 300*a*, the longitudinal rotation axis Xb of the right bicycle 300*b*, the vertical axis Ya of the left bicycle 300*a*, the vertical axis Yb of the left bicycle 300*b*, and the transverse rotation axis Z of assemblage.

Figure 3B:
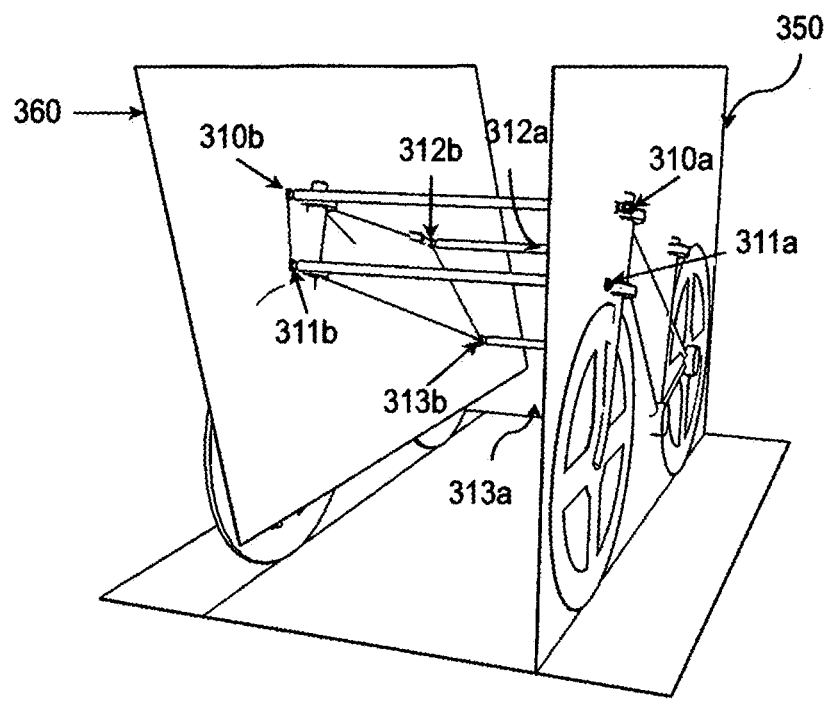
FIG. 3B shows the front perspective view of a side-by-side flexible twin bicycle assemblage illustrating the link bar connectors with coplanar pivot point geometry in accordance with the principles of the present disclosure.

FIG. 3B shows a perspective diagram illustrating the frame centerline plane 350 on the left bicycle wood scale model 300*a*, and the articulating joint connectors plane 360 on the right bicycle 300*b*. The center of the spheres of the spherical rod end bearings 310*b*, 311*b*, 312*b* and 313*b* are located on plane 360. The collar 320 arrangement allows for adjustments set the pivot points at the center of the spherical rod end bearings 310*b*, 311*b* and 312*b* corresponding to the right bicycle 300*b* frame to define the inclined plane 360. The rear bottom link bar right support 330*b* is then located in such a manner that the pivot point at the center of the spherical rod end bearing 313*b* will also fall on the inclined plane 360. There is a corresponding mirror image inclined plane (not shown) on the right bicycle 300*b*. These planes can be made to lie vertically and converge only to the rear by setting the two front link bars 310 and 311 of the same length and set the four corresponding pivot points to fall alternatively to the outside of the center plane, on the center plane or to the inside of the center plane of each bicycle.

Figure 3C:
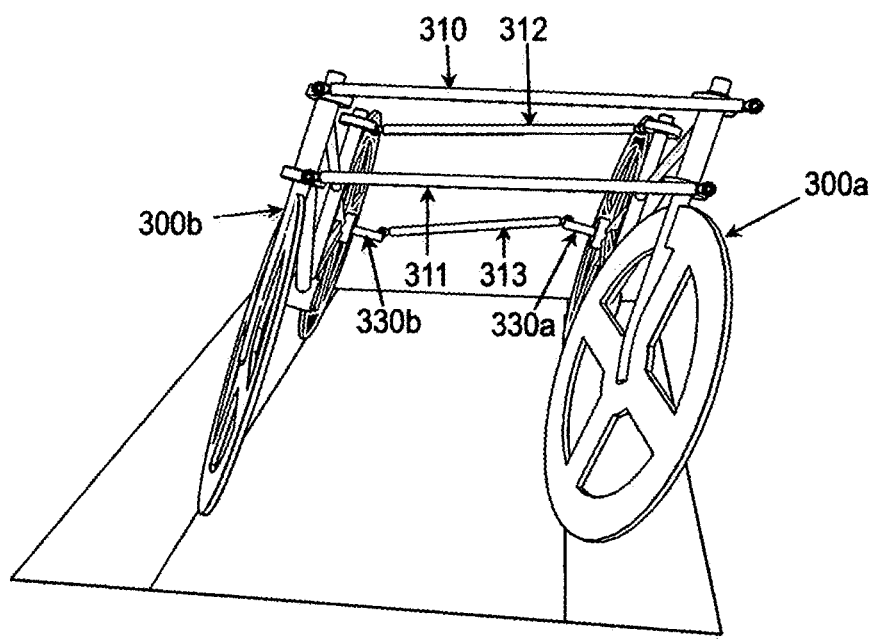
FIG. 3C shows the front perspective view of a side-by-side flexible twin bicycle assemblage illustrating the link bar positions when said assemblage leans around the longitudinal axis of each bicycle when in a turn in accordance with the principles of the present disclosure.

FIG. 3C shows a front view perspective diagram of the ⅝-scale wood model with the model bicycles 300*a* and 300*b* simulating leaning into a turn and illustrating the relative rotations and positions assumed by the four link bars 310, 311, 312 and 313 and the rear bottom link bar supports 330*a* and 330*b*.

Figure 3D:
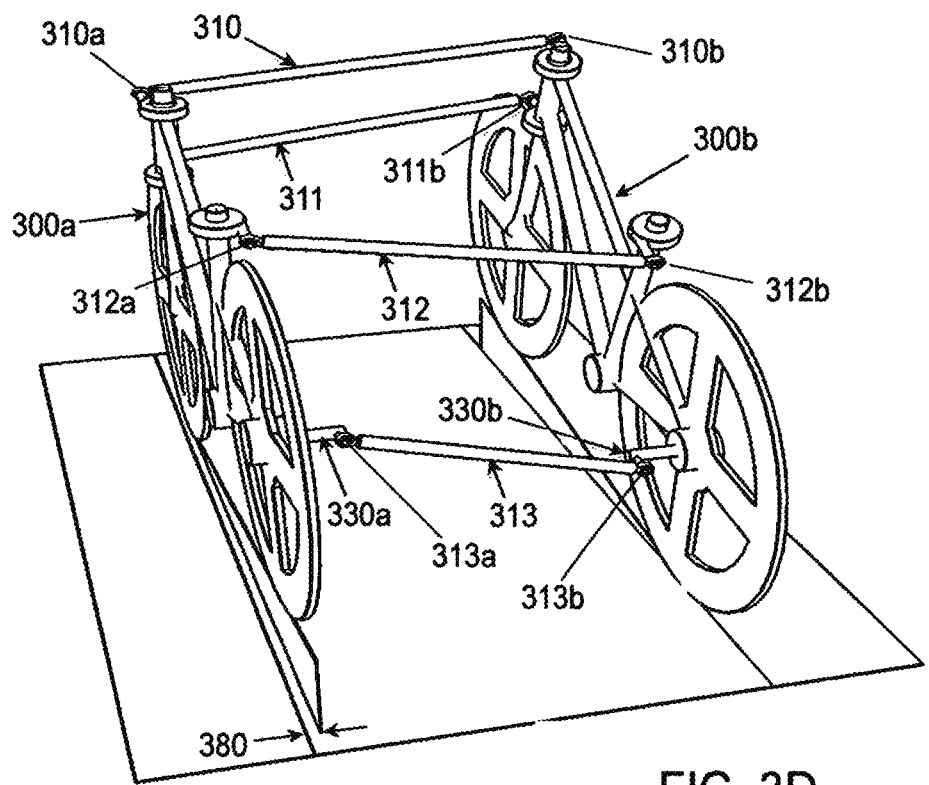
FIG. 3D shows the rear perspective view of a side-by-side flexible twin bicycle assemblage illustrating the link bar positions when each bicycle of said assemblage rotates in opposite directions around the assemblage lateral or transverse axis in accordance with the principles of the present disclosure.

FIG. 3D shows a rear view perspective diagram of the bicycles 300*a* and 300*b* simulating turning around the transverse axis Z of the assemblage and illustrating the relative rotations and positions assumed by the four link bars 310, 311, 312 and 313, the spherical rod end bearings 310*a*, 310*b*, 311*b*, 312*a*, 312*b*, 313*a* and 313*b*, the rear bottom link bar supports 330*a* and 330*b*, and the reduction in track 380 resulting from the twist of the assemblage around the transverse axis Z.

Figure 3E:
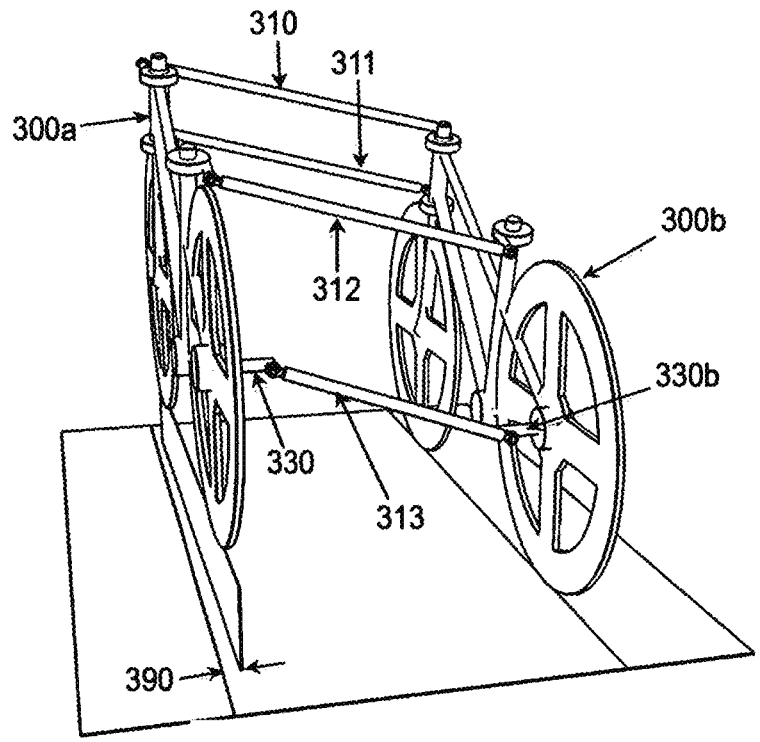
FIG. 3E shows the rear perspective view of a side-by-side flexible twin bicycle assemblage illustrating the link bar positions when each bicycle of said assemblage is displaced along its normal axis as when riding at a different elevation in relation to the other bicycle in accordance with the principles of the present disclosure.

FIG. 3E shows a rear view perspective diagram of the ⅝-scale wood model with the model bicycles 300*a* and 300*b* simulating riding at different elevations and illustrating the relative rotations and positions assumed by the four link bars 310, 311, 312 and 313 and the rear bottom link bar supports 330*a* and 330*b*, and the resulting reduction in track 390.

Operation—Coplanar Pivoted Joints

The Side-by-Side Flexible Twin Bicycle comprises pivoted points on inclined divergent planes like the inclined plane 360 on the left bicycle 300*a* of FIG. 3B and its corresponding mirror image inclined plane (not shown) on the right bicycle 300*b*, to form an irregular cuboid with pivoted joints at each of the eight vertices conforming a "V" shape both on front view and top view, independent of the resulting difference between link bar length, would not result in an unintentional non evident rigid assemblage or in unacceptable deviations from parallelism, but would instead allow for unforced rotation around the longitudinal axes Xa and Xb, and the transverse axis Z of said assemblage as shown in FIG. 3C, FIG. 3D and FIG. 3E.

FIG. 3C, FIG. 3D and FIG. 3E are directed to the Side-by-Side Flexible Twin Bicycle assemblage and observing and measuring the angles assumed by each component and using that information in the 3D CAD diagram.

FIG. 3C shows a front perspective diagram of the leaning and steering in a turn. It can be observed in the FIG. 3C that the individual frames 200*a* and 200*b* do not remain parallel. The frame on the inside of the assemblage, 200*a*, assumes a slightly steeper inclination angle. This is related to the vertical convergence of the pivot point plane towards the bottom in a fashion analogous to the Ackerman steering geometry discussed earlier. The inclination of both frames results in a reduction of their separation that is proportional to the length of each link bar multiplied by the cosine of the inclination angle. There is also a slight horizontal convergence of the pivot point plane towards the rear. The separation at the rear of the assemblage is further reduced because the rear bottom link bar 213 is the shortest and it has to assume a steeper inclination angle. This steeper inclination angle, combined with the inclination of the rear bottom link bar supports 230a and 230 b further reduces the separation at the rear of the assemblage. The steeper inclination angle of the inside frame 200a, combined with the narrowing effect at the rear of the assemblage, contributes to the inside bicycle assuming a tighter turn radius complementing the effect of the Ackerman steering geometry explained earlier. The magnitude of these divergences in leaning angles and between the front and rear track are considered inconsequential.

FIG. 3D shows a rear view perspective diagram of the assemblage simulating turning around the transverse axis. In this case the left side bicycle 300a is shown on a descending ramp while the right side bicycle 300b is shown on an ascending ramp. While experimenting simulating different rotations around the transverse plane Z it was found that, contrary to the longitudinal axes Xa and Xb that lie in a fixed position defined by the contact patch of the front and rear tire of each bicycle, the location of the transverse axis Z is dependent on the particular elevations or depressions encountered by each bicycle along its travel path. Thus, link bars 310, 311, 312 and 313 assume different inclination angles depending on the location of the transverse axis Z and, as explained earlier, the transverse axis Z coincides with the rear wheels hub centerline when the vertical diagonal bars are set to render the assemblage vertically rigid. The distance between the two frames is reduced proportional to the cosine of the particular link bar angles; the net effect is a reduction in track 380.

FIG. 3E shows a rear view perspective diagram of the bicycle 300a riding at a higher elevation than model bicycle 300b. Link bars 310, 311, 312 and 313 assume slightly different inclination angles related to their different lengths and the distance between the two frames is reduced proportional to the cosine of the link bar angle, the net effect is a reduction in track 390.

DETAILED DESCRIPTION ALTERNATE
EMBODIMENT—FIGS. 4A, 4B, 4C, 4D AND 4E

Figure 4A:
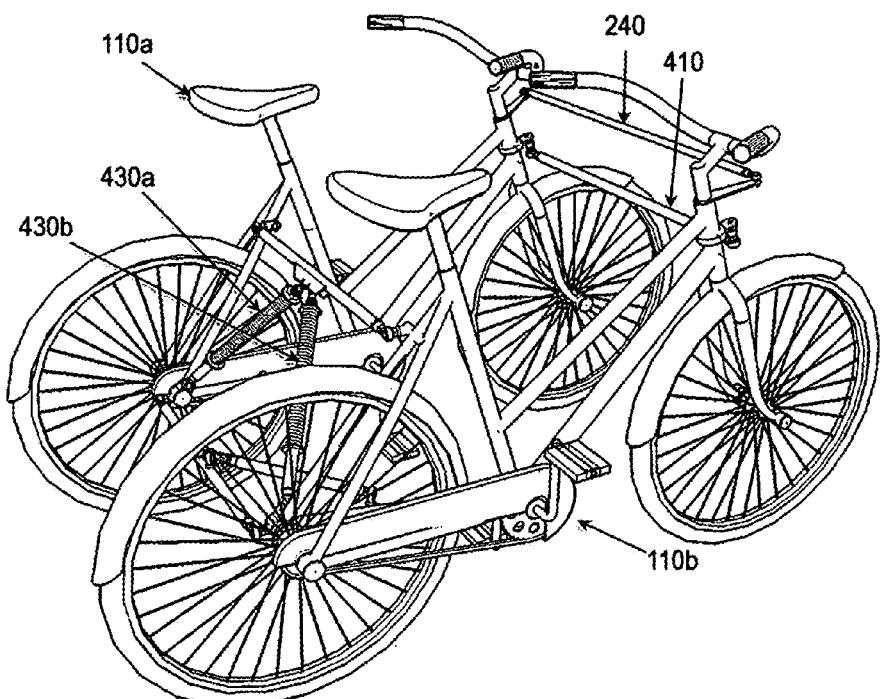
FIG. 4A shows two bicycles connected side-by-side in parallel with single link bar connected on the front side of the head tube and vertical diagonal links with compression springs as installed in the first test prototype in accordance with the principles of the present disclosure.

Another embodiment of the side-by-side flexible twin bicycle is shown in FIG. 4A, side perspective view. The difference between the first and second embodiment is that the first embodiment employed a single front link bar 410 and vertical diagonal bars 430a and 430b with compression springs. All other components are the same as for the second embodiment discussed above.

Figure 4B:
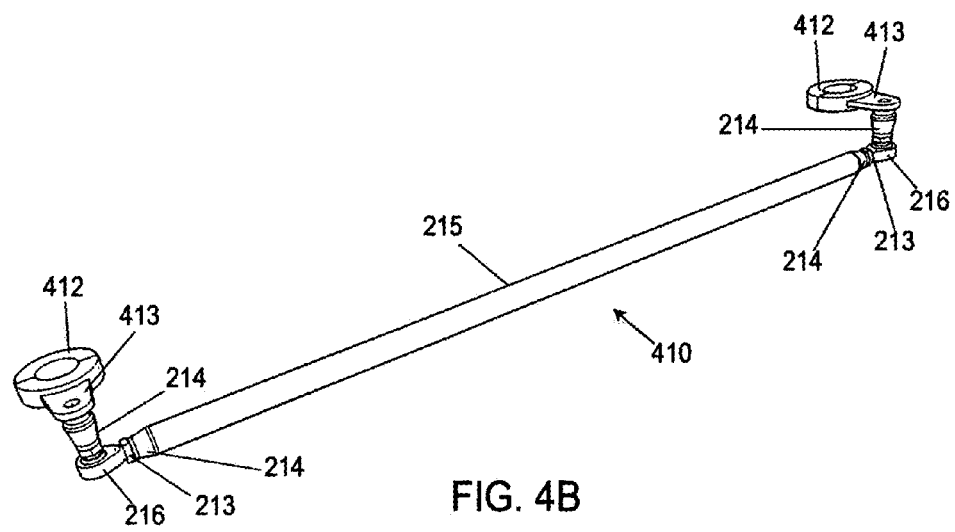
FIG. 4B shows a perspective view of the single front link bar and its components as installed in the first test prototype in accordance with the principles of the present disclosure.

FIG. 4B shows a perspective view of the single front link bar 410, with link bar support collar composed of split shaft collars 412, support tabs 413, and threaded inserts 214. The single front link bar 410 subassembly is composed of spherical rod end bearings with threaded lug 216, locknuts 213, and threaded inserts 214 attached to each end of link bar tube 215.

Figure 4C:
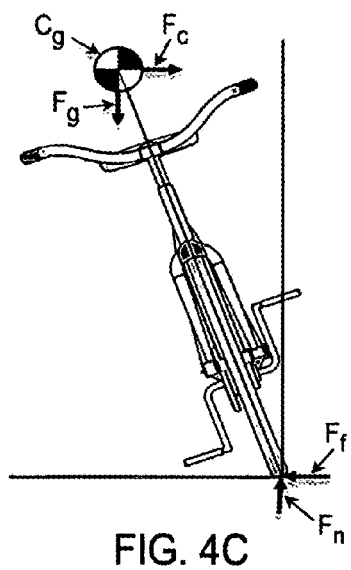
FIG. 4C shows a simplified diagram of the forces acting on a bicycle while it is leaning in a turn in accordance with the principles of the present disclosure.

FIG. 4C shows the front view of a single bicycle leaning into a turn, the center of gravity of the bicycle and rider $C_g$, and a simplified model of the forces acting on the bicycle, the centrifugal force $F_c$, the gravitational force $F_g$, the centripetal (friction) force $F_f$, and the normal force $F_n$.

Figure 4D:
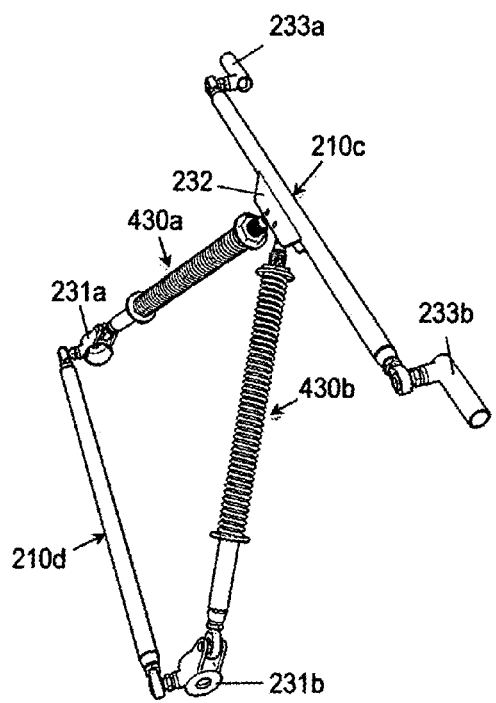
FIG. 4D shows the perspective view of the rear link bar subassembly including the left and right vertical diagonal bars with compression springs as assembled in the first test prototype in accordance with the principles of the present disclosure.

FIG. 4D shows a perspective view of the rear link bars assemblage similar to FIG. 2C with the exception that the diagonal vertical links 430a and 430b are fitted with compression springs. The rest of the description is the same as that of FIG. 2C.

Figure 4E:
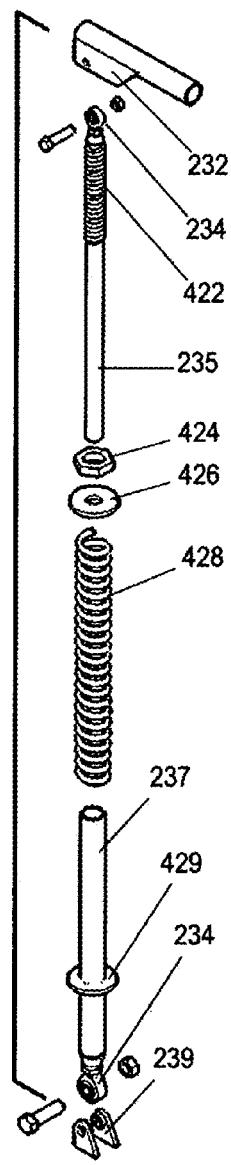
FIG. 4E shows right vertical diagonal bar with a compression spring of FIG. 4E in exploded view in accordance with the principles of the present disclosure.

FIG. 4E shows an exploded view of the right vertical diagonal link bar 430b. Said link bar subassembly is composed of the vertical diagonal bar support tabs 232, upper spherical rod end bearing 234, the inner concentric tube 235, a threaded sleeve 422 attached to the inner concentric tube 235, spring adjustment nut 424, spring support washer 426, compression spring 428, spring retainer washer 429 attached to the outer concentric tube 237, lower spherical rod end bearing 234 and lower support tabs 239 that are attached to the right rear bottom link bar support assemblage 231b. The left vertical diagonal link bar 430a and attachments is a mirror image of the right horizontal diagonal link bar 430b.

Operation—First Prototype with Single Front Link Bar
Problems with Bicycle Frame Flexing Under Lateral Loads The first problem encountered was progressive misalignment and excessive scrubbing of the front tires. It was observed, even when attempting to run on a straight line, that the assemblage consisting of the right side handlebar, fork and front tire, would progressively twist on its vertical plane reducing the front track of the assemblage and progressively increasing scrubbing and rolling resistance. The twisting effect became so extreme that the rider of the offending bicycle had to do a small jump, enough to lift the front tire from the ground to relieve the load, to allow the handlebar, fork and front tire assemblage to spring back to alignment. But the twisting would immediately resume after the front tire fell back on the ground.

This problem was initially attributed to misalignment of the assemblage but could not be resolved with link bar length fine-tuning adjustments. Then a test was done that consisted of manually applying a bending torque, using the front tire and fork assemblage as a lever arm, and it was observed that the head tube would twist around the spherical rod end bearings 234 axis of the single front link bar assemblage 410 and transmit that torsion to the bicycle frames. The twisting motion was most marked at the bottom brackets and pedal assemblies that were observed to move sideways in the order of one to two inches depending on the force applied. The steering link bar 240 did not contribute to the assemblage rigidity since the twisting motion would cause the handlebars, fork and tire subassembly to rotate on the head tube axis.

The twisting of the head tube joint is explained by Wilson (2012, p. 381) as " . . . the front forks act as a long lever arm to "twist" that joint. [ . . . ] therefore, in the welded or brazed case [ . . . ] stresses and deflections will be high. The origin of this problem is related to flexing of the front tires under lateral loads." In relation to tires Wilson (2012, p. 297) explains: "Tires are considered to be somewhat flexible vertically for obstruction swallowing, but rigid otherwise. For many purposes this approximation is good enough. But in actuality, the possibility of lateral flex of a tire means that when tires are supporting a side load, they do not travel exactly in the direction they are pointed."

The "not traveling exactly in the direction they are pointed" is the beginning of the twisting of the bicycle frames. The lateral loads on tires can originate from the pedaling forces, from unintended rider movements to the side or from uneven road surface among other causes. Wilson (2012, p. 355) also explains the phenomenon of flexing of the frame and the difficulty in bracing to increase its rigidity: "The tubes in a bicycle's frame usually experience, during riding, a combination of bending, shear, torsion, and tension or compression. Appropriate sizes for the frame's components have been arrived at by experience, not by analysis or prediction. And even with advanced engineering software it would be difficult and expensive to analyze all the combined stresses that act on a bicycle frame and therefore improve its design more than marginally."

The magnitude of this problem was such that the frame of the right side bicycle of the first prototype was permanently deformed and bent to the extent that the front and rear tire appear to be forming a narrow "X" when seen from the front.

The single front link bar 410 on the head tube was replaced with two link bars 210*a* installed above on the top tube and 210*b* installed below on the bottom tube. These two link bars provided enough rigidity to the assembly to reduce the twisting of the frames to be essentially imperceptible.

As discussed earlier, prior art that would probably suffer from flexing of frames under lateral loads resulting in misalignment and the bending stresses to the frames include U.S. Pat. No. 8,146,937 B2 to Chin, et al., 2012, Apr. 3, shown in FIG. 8B Prior Art; U.S. Pat. No. 7,669,868 to Underhaugh, 2010, Mar. 2; U.S. Pat. No. 3,836,175 to Pomerance et al., 1974, Sep. 17, shown in FIG. 8B Prior Art; U.S. Pat. No. 3,350,115 to Ferrary, 1967, Oct. 10; and U.S. Pat. No. 469,722 to Riess, 1892, Mar. 1; since these depend on only one link bar on the front that does not provide the vertical rigidity of a quadrilateral rendering the assemblage prone to the same twisting and misalignment problem experienced with the first prototype.

Figure 8A:
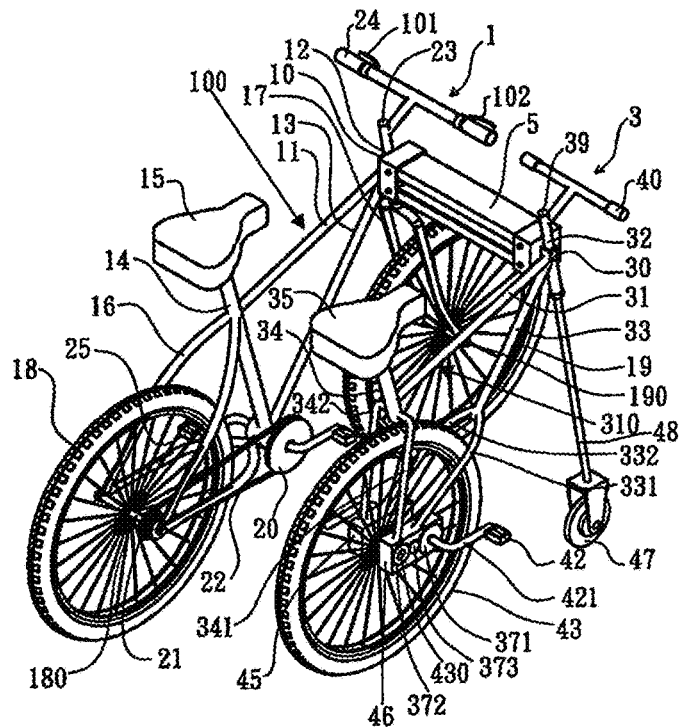
FIG. 8A is a copy of FIG. 1A Prior Art from U.S. Pat. No. 8,146,937.
Figure 8B:
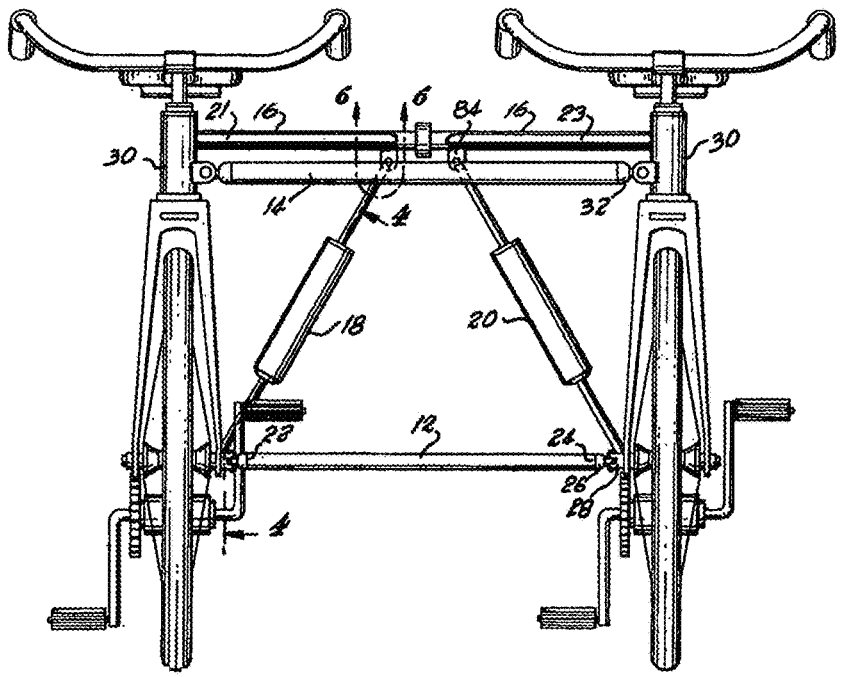
FIG. 8B is a copy of FIG. 1 Prior Art from U.S. Pat. No. 3,836,175.

Making reference to FIG. 8A Prior Art, U.S. Pat. No. 8,146,937 B2 to Chin, et al., 2012, Apr. 3; this assemblage consists of a bicycle with a third "auxiliary" wheel joined by a single "articulating mechanism" link element 5 to form a tricycle. In relation to the transverse axis running through the center of said articulating mechanism, it is probable that, upon road testing of this assemblage, the combinations of twisting and bending forces around said transverse axis, due to vertical and lateral loads from road-induced deformation of tires, will be of such magnitude that the third auxiliary tire will twist and wander on both the horizontal and vertical planes and eventually the mechanical integrity of the whole embodiment would be compromised.

Another shortcoming of said assemblage is related to longitudinal stability. In a regular bicycle, the horizontal distance from the center of gravity to the front tire contact patch is a critical parameter to prevent an "end-over-end" (throwing the riders and bicycle over the handlebar and front wheel) when descending steep slopes or during emergency braking. Wilson (2012. p. 245) explains: "Skilled riders increase their deceleration capability when descending steep slopes by crouching as low as possible and as far behind the bicycle's saddle as possible." This is to move the center of gravity as low and to the rear as possible to reduce the inertial overturning torque and increase the opposing front tire reaction torque to reduce the possibility of an "end-over-end".

The center of gravity of the assemblage in U.S. Pat. No. 8,146,937 B2 to Chin, et al., 2012, Apr. 3; is located somewhere between the primary bicycle 100 and the auxiliary bicycle 310, while the effective front tire contact patch is moved back approximately to the middle of a line connecting the primary bicycle 100 front tire contact patch with the auxiliary bicycle 310 tire contact patch. The reduced horizontal distance from the effective front tire contact patch to the center of gravity reduces the effective front tire reaction torque increasing the likelihood of an "end-over-end" during cornering or braking as compared to a regular bicycle.

An attempt to improve the longitudinal stability of said embodiment with an additional auxiliary wheel 47 is shown in FIG. 8A Prior Art. It is claimed that with this modification "the twin-frame bicycle of the invention is highly stable without any possibility of tumbling, even in a high-speed riding and/or a sudden braking". Based on the experience with the single link bar in the first prototype discussed earlier, and Wilson's (2012) explanations on emergency braking decelerations and on frame rigidity (or lack of it) during lateral loads to said auxiliary wheel 47, it is very likely that the relatively long and slender adjustable bar 48 will bend and collapse immediately after experiencing a lateral load on said auxiliary wheel 47 with potential for an "end-over-end" or "tumbling" during cornering or braking that could lead to a serious accident.

Another attempt to improve the lateral stability shown in FIG. 22 of Chin's patent to maintain alignment between the primary bicycle 110 and the auxiliary bicycle 310 consist of a second "articulating mechanism" link element 5 between the rear wheel of the primary bicycle and the wheel of the auxiliary bicycle. The primary bicycle 110 and the auxiliary bicycle 310 are secured at two points, however, it is unlikely that this modification will significantly reduce the twisting of both bicycles around the axis defined by the two support points of each bicycle when the tires are exposed to lateral forces. The resulting bending would look like in a front view to an upright or an inverted V depending on the net direction of the forces from the road to the tires. This type of continued flexing would eventually result in metal fatigue and failure.

The alternate embodiment shown in FIG. 23 of Chin's patent consists of two bicycles held together by a single "articulating mechanism" link element 5 between the head tube of the two bicycles. It is unlikely that this arrangement will prevent both horizontal and vertical rotation of the bicycles around the single pivot point connected to the head tubes resulting in bending and twisting of said link element 5 and the embodiment going out of alignment due to lateral forces on the front and rear tires.

Operation—Use of Vertical Diagonal Springs

Balance of the Lateral Forces Acting on a Bicycle

The following discussion on forces acting on a bicycle and balance in a turning maneuver is relevant for the explanation of the use of springs in some prior art embodiments and for the explanation of the problem encountered early while testing the first embodiment of the side-by-side flexible twin bicycle.

Making reference to FIG. 4C, balance in a bicycle is maintained when the resulting torques from the centrifugal force $F_c$, and the gravitational force $F_g$ acting through the tire contact patch with the road are equal. The gravitational force $F_g$ is the product of the rider and bicycle mass multiplied by the acceleration of gravity. The centrifugal force $F_c$ is the product of the rider and bicycle mass multiplied by square of the speed, divided by the radius of the turn. Thus, the leaning angle of a bicycle in a turn is directly proportional to the square of the speed and inversely proportional to the radius of the turn.

A simple explanation of how a rider balances a bicycle is when the rider feels the bicycle falling to one side; the rider "steers into direction of the fall". That steering motion causes a curved trajectory of such radius that generates the appropriate centrifugal force to avoid the fall. Fajans (*Steering in bicycles and motorcycles*. American Journal of Physics, 68(7), 654-659) explains in a detailed sequence of steps how a rider executes a turn. In summary, the rider first applies a small amount of steer in the opposite direction of the turn and that steering motion generates a centrifugal force that causes the rider and bicycle to lean ("fall") into the desired direction of the turn. The rider then "steers into direction of the fall" to maintain balance and lean angle while following the desired curved path until the turn is completed. Then the rider applies an almost imperceptible additional amount of steer into the direction of the turn to generate the additional centrifugal force that pushes the bicycle out of the lean to continue traveling in a straight line.

Both balancing and turning a bicycle are unconscious motor skills that the rider learns when learning to ride the bicycle and that require the brain to coordinate inputs from multiple sensory systems. The vestibular system located in the inner ear provides the leading contribution about balance and movement. The vestibular system is capable of detecting both the centrifugal force $F_c$, gravitational force $F_g$. When riding in a turn the brain of an experimented bicycle rider interprets that the rider and bicycle are not falling even thought it is receiving visual information that both rider and bicycle are leaning to one side.

Operation—Use of Vertical Diagonal Springs

Difficulties with Springs Intended to Keep the Assemblage Upright

Making reference to the first embodiment as shown in FIG. 4A fitted with compression springs on the vertical diagonal bars 430a and 430b, once substitution of the single link bar 410 with the two link bars 210a and 210b as shown in FIG. 1 resolved the problem related to twisting of the frames explained earlier, the next problem encountered was related to entering, executing and exiting from turns.

It was found that the problem was related to the intended function of the compression springs in the first prototype, the same intention as stated in prior art U.S. Pat. No. 3,836,175 to Pomerance, to "maintain the bicycles in a vertical position when standing or moving in a straight direction and allow the bicycles to lean when turning as would be the case when a single rider makes a turn". The experience while testing the first prototype was that the use of springs in this manner made it essentially impossible to complete a steady turn following the intended curved path.

The force that an extension or a compression spring exerts is proportional to its deflection or change in length. The force divided by the deflection is the spring rate and is assumed to be essentially constant within the recommended spring deflection range. The spring will not exert a force unless it undergoes a deflection. Thus, to keep the bicycles and riders in a vertical position when standing requires relatively strong springs and pre-loading to ensure that said springs are under compression and exerting enough force to prevent the bicycles and riders from leaning and falling to one side or the other.

When the compression springs 428 on the first prototype vertical diagonal bars 430a and 430b were set with enough preload to keep the bicycles and riders in a vertical position when standing and said first prototype was inclined into a turn the springs were compressed in proportion to the lean angle and this resulted in an increase of the force exerted by the spring proportional to the lean angle that pushed the bicycles in the opposite direction of the lean. The difficulty in following the desired arc of the turn in this situation arises from the fact that, contrary to the case of the centrifugal force $F_c$, and the gravitational force $F_g$, the vestibular system of the rider does not detect this additional upright spring force. The brain interprets the resulting effect in the same manner as if the riders and the side-by-side flexible twin bicycle assemblage are falling to the outside of the turn. The unconscious motor reaction of the rider is to "steer into the fall" and away from the desired arc of the turn.

The force exerted by the springs is in the opposite direction of the gravitational force $F_g$ and increases as the lean angle is increased as needed for turning at higher speed. The extreme situation is that when the force exerted by said springs is such that it cancels the gravitational force $F_g$, the bicycle, "in zero gravity" becomes unsteerable. In our case while testing the first embodiment, the spring force was of a lower magnitude, however, it made it very difficult to execute a steady turn.

We found that this effect can be consciously overcome while riding, by using relatively weak springs and little or no preload, by applying a quick steering jerk in the opposite direction of the desired turn. But this defeated the original objective of maintaining the bicycles and riders in a vertical position when standing. The method to consciously overcome this effect is similar to when initiating a turn to counter steer to help compress the springs, followed by both riders leaning out-of-balance into the turn to counteract the additional spring force that resulted. However, maintaining a constant inclination and the corresponding steady turn radius proved to be difficult. The increase in spring force as the lean angle increased kept pushing the bicycles to the outside of the turn and required a series of counter steering jerks in the opposite direction which in turn resulted in a wobbly and unpredictable widening of the turn arc. Both the repetitive steering jerks in the opposite direction and the leaning of the body to counter the spring force feels "unnatural" to bicycle riding. This technique is considered to be potentially dangerous and is not recommended since it requires a very aggressive sequence of counter steering jerks that not all riders may be able to execute and the resulting widening of the turn away from the intended turn arc may put the riders and bicycles in a dangerous situation, for instance into the front of oncoming motor vehicle traffic on the opposite lane.

Prior art including U.S. Pat. No. 8,146,937 B2 to Chin, et al.; U.S. Pat. No. 3,836,175 to Pomerance and other US patents employ springs or semi-resilient assemblies to keep assemblage and riders upright is likely to exhibit this undesirable and potentially dangerous behavior.

It was found that it is preferable not to use springs to keep assemblage and riders upright and instead allow the embodiment when at rest to lean to one side or the other, as a single bicycle would do and provide mechanical means to limit the maximum lean angle, which is as discussed earlier, a function of travel speed and radius of turns, based on rider preference.

Operation—Limit on how Much Leaning is Desirable

There is a limit on how much leaning is desirable in a particular riding situation. As explained earlier, the leaning angle of a bicycle in a turn is directly proportional to the square of the speed. The average speed of a cyclist depends on a number of factors including weather, terrain, style and weight of the bicycle and cyclist physical condition.

In an urban environment, a person on a sit-up style roadster at a leisure pace might do less than 6 mph. Most cyclists can achieve 10-12 mph very quickly with limited training. More experienced cyclists doing short to medium distances of 20 to 30 miles can average around 16 mph. A competent rider, with regular training, can do distances of 50 to 60 miles at an average speed of 20 to 24 mph.

The leaning angle of a bicycle in a turn is inversely proportional to the radius of the turn. The following tests, on what is now termed the second prototype as shown in FIG. 1, were conducted after the compression springs 428 were removed. The maximum leaning of the resulting assemblage reached a mechanical limit, see FIGS. 4D and 4E, when the lower part of the threaded sleeve 422 welded to the inner concentric tube 235, with the compression spring 428 removed, reached the top of lower concentric tube 237. This was about 15 degrees inclination from vertical. We found that this inclination was adequate for speeds between 8 to 12 mph and turn radius between 20 and 30 feet typical of an urban setting.

Riding through the turn without the compression springs 428 felt similar to riding an individual bicycle up to the point where the mechanical limit was reached, from then on it felt like riding a bicycle with training wheels. A sudden stop in the rate of inclination was felt when the mechanical limit was reached. In subsequent tests the springs were installed loose to dampen the sudden stop by setting the spring adjustment nut 424 about 1 inch above the top of the spring to allow for unhindered inclination and dampened the jolt just when the mechanical limit was to be reached. The mechanical limit is reached by reducing the speed when going through the turn to a sufficiently low speed. To prevent reaching the mechanical stop requires a slightly higher speed.

Varying the distance between the spring 428 and the spring adjustment nut 424 allows the riders to set the maximum angle of inclination as a function of their riding style and preferred speeds for a particular road. Setting the spring adjustment nut 424 for maximum compression of the vertical diagonal springs 428 will result in an essentially rigid assemblage that will keep the bicycles and riders vertical even when stopped. Riders wishing to ride at low speeds similar to a quadracycle would prefer this setting. Setting the spring adjustment nut 424 for maximum separation from the top of the vertical diagonal springs 428 will result in an embodiment that will leant as much as the particular design of the vertical diagonal links will allow allowing the riders to travel at high speeds and take turns at high inclination angles. Removing the vertical diagonal links will allow the assemblage to fall to one side or the other and travel at maximum speeds and inclinations typical to those of a competent rider on single bicycle.

The above-cited research and development work has resulted in the demonstration of an innovative, effective and safe side-by-side flexible twin bicycle embodiment that can be simultaneously or independently operated by one or more driver riders; provides the vertical stability of a four-wheel vehicle; allows for the simultaneous banking, rolling or leaning around the longitudinal axis to enter, execute and exit from turns in a manner similar to riding a typical single bicycle; allows for the independent rotation or pitching around the transverse or lateral axis to conform to bumps or hollows in the riding path, and allows for the independent vertical surge to conform to differences in elevation in the riding path, while maintaining relative parallel position that, to our knowledge, none of the cited previous art can provide.

DETAILED DESCRIPTION OF ALTERNATE EMBODIMENTS—FIGS. 5A, 5B, AND 5C

Various aspects described or referenced herein may be directed to different embodiments of an inventive side-by-side flexible twin bicycle having various features as illustrated and described and/or referenced herein.

Figure 5A:
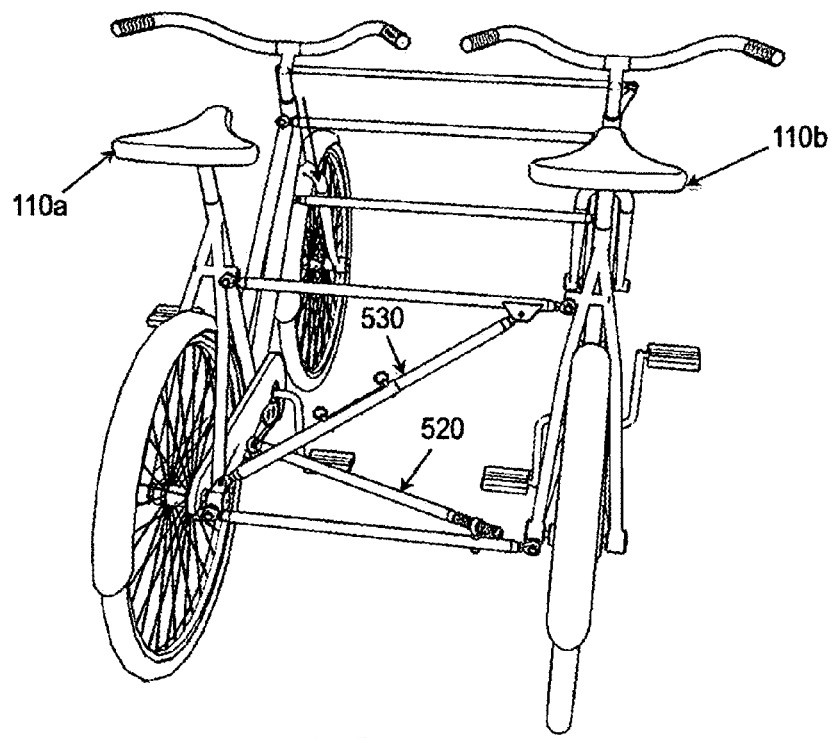
FIG. 5A shows an alternate embodiment of the Side-by-Side Flexible Twin Bicycle with a single horizontal diagonal link bar and a single vertical diagonal bar in accordance with the principles of the present disclosure.

FIG. 5A shows a rear perspective view of an alternate embodiment of the side-by-side flexible twin bicycle with a single horizontal diagonal link bar 520 and a single vertical diagonal bar 530.

Figures 5B, 5C:
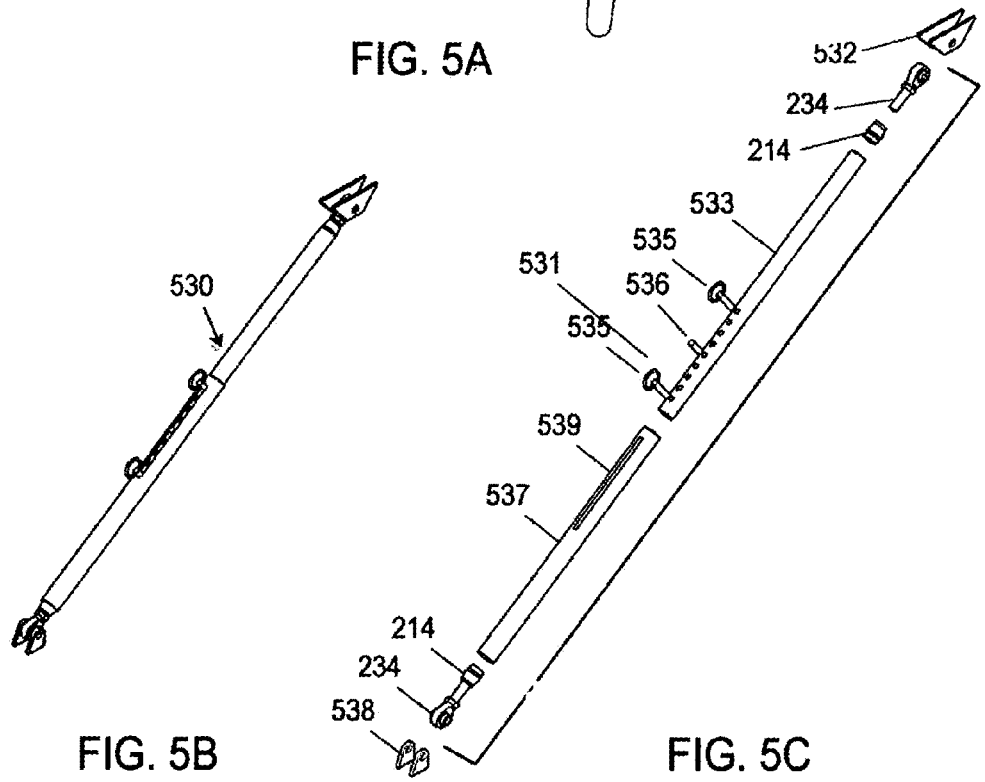
FIG. 5B shows an example of a single rear vertical diagonal bar in perspective view in accordance with the principles of the present disclosure.
FIG. 5C shows an example of a single rear vertical diagonal bar in exploded view in accordance with the principles of the present disclosure.

FIG. 5B shows an example of a single rear vertical diagonal bar 530 in perspective view.

FIG. 5C shows an example of a single rear vertical diagonal link 530 in exploded view. Said vertical diagonal bar subassembly is composed of the top support tabs 532, spherical rod end bearings 234, threaded inserts 214, the inner concentric tube 533, quick release pin 535, dowel pin 536, outer concentric tube 537, longitudinal slot 539 and the bottom support tabs 538 that are attached to the left rear bottom link bar support 231a.

An exploded view of the single horizontal diagonal link bar 520 and attachments is not included since it is similar to the left horizontal diagonal link bar 220a shown in FIG. 2A with the exception that the corresponding link tube 221 is longer and the attachment point of the spherical rod end joint 234 is displaced from the middle toward the right end of the rear bottom link bar 210d.

Operation—Single Vertical Diagonal Link Bar

The vertical diagonal bar 530 limits the maximum sideways inclination in either direction by allowing the inner concentric tube 533 shown in FIG. 5C to slide into the outer concentric tube 537 until the dowel pin 536 which secured to the inner concentric tube 533 and its ends protrude into the groove 539 of the outer concentric tube 537 reaches either end of the groove 539. The length of the groove 539 determines the maximum movement of the inner concentric tube 533 into the outer concentric tube 537 and hence the maximum inclination of the bicycles 110n and 110b. The inner concentric tube 533 is provided with a number of perforations 531 that coincide along the length of the groove 539 on the outer concentric tube 537 and are used to accommodate quick release pins 535 to reduce the maximum inclination of the bicycles 110a and 110b to several intermediate values chosen based on rider preference. The assemblage is rendered rigid when the quick release pins 535 are located at the extreme perforations, which coincide with the ends of the groove 539.

The operation of the single horizontal diagonal link bar 520 is similar to the operation of the diagonal link bar 220b discussed earlier.

DETAILED DESCRIPTION OF ALTERNATE PIVOTED JOINT EMBODIMENTS—FIGS. 5D AND 5E

Various aspects described or referenced herein may be directed to different embodiments of an inventive pivoted joint having various features as illustrated and described and/or referenced herein.

DETAILED DESCRIPTION QUICK DISCONNECT JOINT EMBODIMENT—FIGS. 5D AND 5E

Figure 5D:
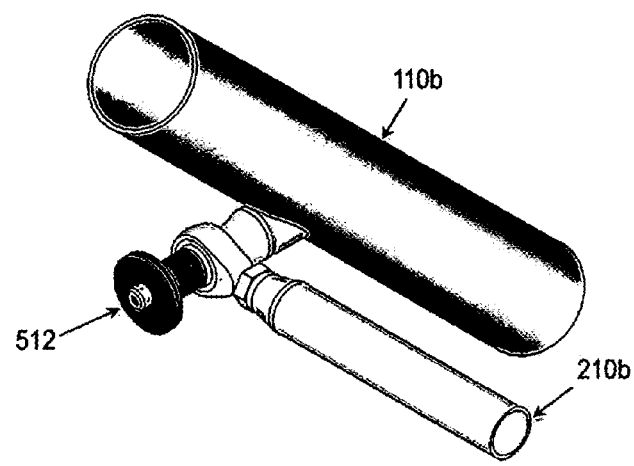
FIG. 5D shows an example of a quick release mechanism on a pivoted joint connection in perspective view in accordance with the principles of the present disclosure.

FIG. 5D shows the quick disconnect link bar joint 512 embodiment in perspective view.

Figure 5E:
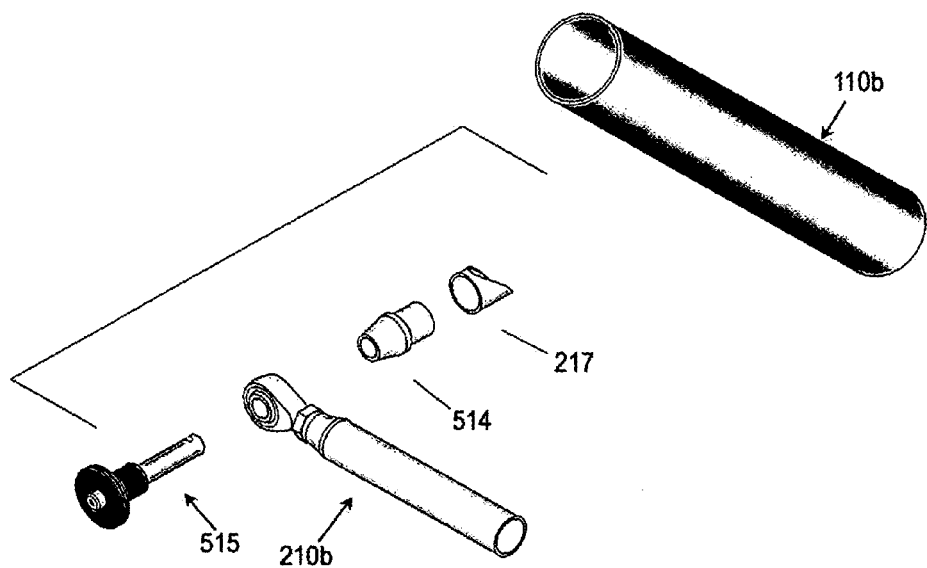
FIG. 5E shows an example of a quick release mechanism on a pivoted joint connection in exploded view in accordance with the principles of the present disclosure.

FIG. 5E shows the quick disconnect link bar joint 512 embodiment in exploded view. Said quick disconnect joint link bar is composed of the butted bushing 217 that is attached to the bicycle 110b frame, the smooth bore insert 514 that is attached to the butted bushing 217, and the quick release lock pin 515.

Operation—Quick Disconnect Joint Embodiment

The quick disconnect joint allows fast assembly and disassembly of the side-by-side flexible twin bicycle into two bicycles for individual use. Making reference to FIG. 2C, the quick disconnect joint embodiment consists of modifying the rear link bars subassembly 205 by attaching the bottom connection of the vertical diagonal bars 230a and 230b to the lower rear link bar 210d instead of to the left and right rear bottom link bar support assemblies 231a and 231b, so that said modified rear link bars subassembly is supported at four points at the spherical rod end bearings 234 of the upper rear link bar 210c and of the lower rear link bar 210d. The smooth bore inserts 514 are similar to the threaded inserts 214 with the exception that the internal thread is drilled out smooth to accommodate the quick release lock pin 515. The front top link bar 210a, the front bottom link bar 210b and the steering link bar 240 are fitted in a similar manner with quick release connectors. The quick release lock pins 515 are commercially available, one example is the Kwik-Lok® Pins manufactured by Jergens Inc.

DETAILED DESCRIPTION OF ALTERNATE PIVOTED JOINT EMBODIMENTS—FIGS. 5F, 5G, 5H, 5I, 5J, 5K, 5L, 5M, 5N 5O, 5P, 5Q and 5R Note:

FIGS. 5F through 5O represents a series of alternative pivot embodiments that, making reference to FIGS. 1, 2A, 4A, 5A, 6A, 7A, 7B, 7C and 7D, are designed to substitute the function of the vertical diagonal bars 230a, 230b, 250a and 250b, and the horizontal diagonal link bars 220a and 220b. The function of the vertical diagonal bars 230a, 230b, 250a and 250b is to limit the maximum sideways inclination to prevent the side-by-side twin bicycle embodiment from leaning excessively to either side and essentially collapse flat. The function of the horizontal diagonal link bars 220a and 220b is limit to small displacements the surging forward or lagging behind motion of each bicycle in relation to the other during acceleration or braking. The connection between link bar 210b and a section of the down tube of the right side bicycle 110d is used as an example to illustrate the alternate pivoted joint embodiments. These alternate pivoted joint embodiments can be adapted for use on any link bar pivot location.

Figure 5F:
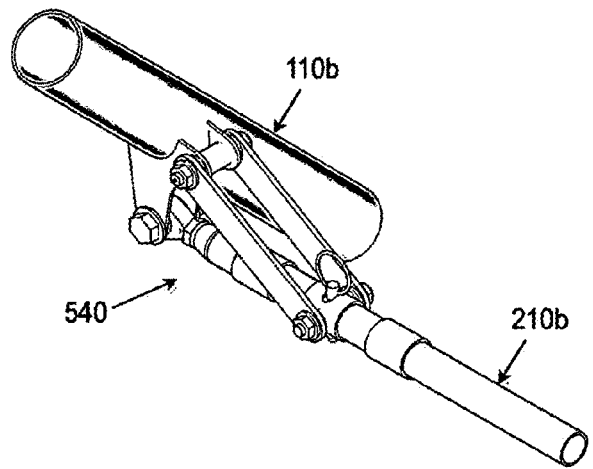
FIG. 5F shows an example of a spring steel strip and concentric sleeve embodiment of the link bar pivoted joint connection in perspective view in accordance with the principles of the present disclosure.
Figure 5G:
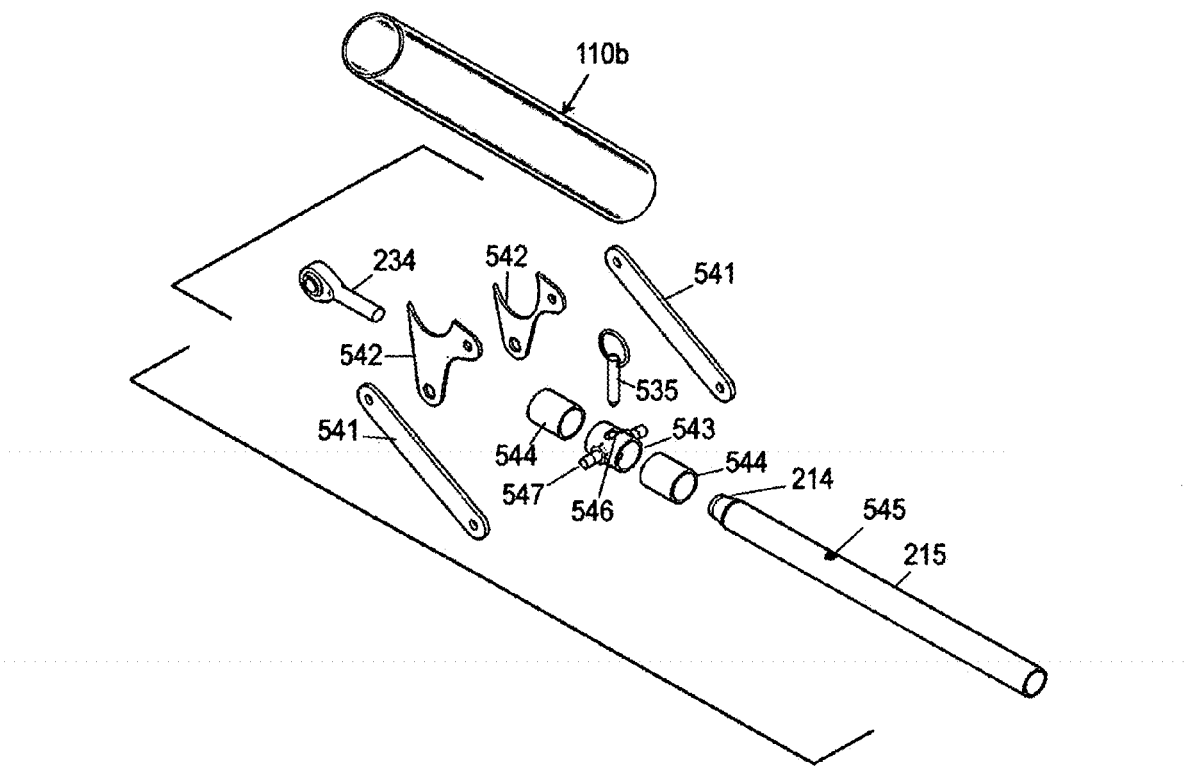
FIG. 5G shows an example of a spring steel strip and concentric sleeve embodiment of the link bar pivoted joint connection in exploded view in accordance with the principles of the present disclosure.

DETAILED DESCRIPTION OF THE SPRING STEEL STRIP AND CONCENTRIC SLEEVE PIVOT JOINT EMBODIMENT—FIG. 5F AND FIG. 5G

FIG. 5F shows the spring steel strip and concentric sleeve link bar pivoted joint embodiment 540 in perspective view.

FIG. 5G shows the spring steel strip and concentric sleeve link bar embodiment 540 in exploded view. Said spring steel strip and concentric sleeve link bar embodiment is composed of the support tabs 542 that are attached to the bicycle frame, the spring steel strips 541 that are attached on one end to the support tabs 542 and at the other end to the sliding collar 543, the fixed collars 544 attached to the link bar tube 215, the hole 545 on the link bar tube 215, the quick release pin 535, the slot shaped transverse opening on the sliding collar 546, the spherical rod end bearing 234, and the threaded insert 214.

Operation of the Spring Steel Strip and Concentric Sleeve Pivot Joint Embodiment in FIGS. 5F and 5G The spring steel strips 541 provide bending resistance to minimize the rotation of the link bar 210b in the horizontal plane and thereby limit to small displacements the surging forward or lagging behind motion of each bicycle in relation to the other during acceleration or braking. The combination of the spring steel strips 541 with horizontal attachment points at both ends, a bolt on the top end and the studs 547 attached to the sliding collar 543 on the other end, allows for rotation of the link bar 210b on the vertical plane while the sliding collar 543 slides on the link bar 210b and thereby allows for leaning of the side by side twin bicycle assemblage.

The fixed collars 544 attached to the link bar tube 215 serve as mechanical stops for the sliding collar 543 to limit the maximum sideways inclination in either direction by allowing the sliding collar 543 to slide on the link bar tube 215 until the sliding collar 543 reaches either of the fixed collars 544. The quick release pins 535 renders the assemblage rigid as it relates to leaning when said quick release pins are inserted through the slot 546 on the sliding collar 543 and the hole 545 on the link bar 210b to allow riding the side-by-side flexible twin bicycle in a vertically rigid mode.

The slot 546 on the sliding collar 543 allows for rotation of the link bar 210b around its centerline axis thereby allowing the side-by-side flexible twin bicycle assemblage to rotate around its transverse axis to accommodate for bumps or hollows on the path of each individual bicycle.

Figure 5H:
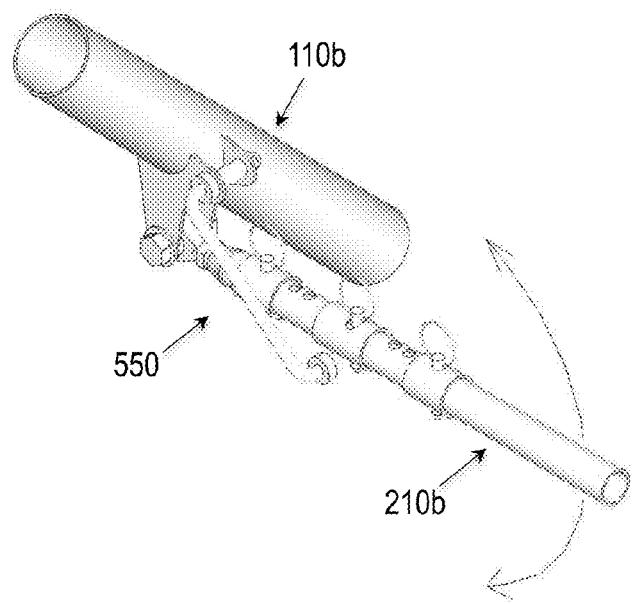
FIG. 5H shows an example of a spring steel "C" wire and concentric sleeve embodiment of the link bar pivoted joint connection in perspective view in accordance with the principles of the present disclosure.
Figure 5I:
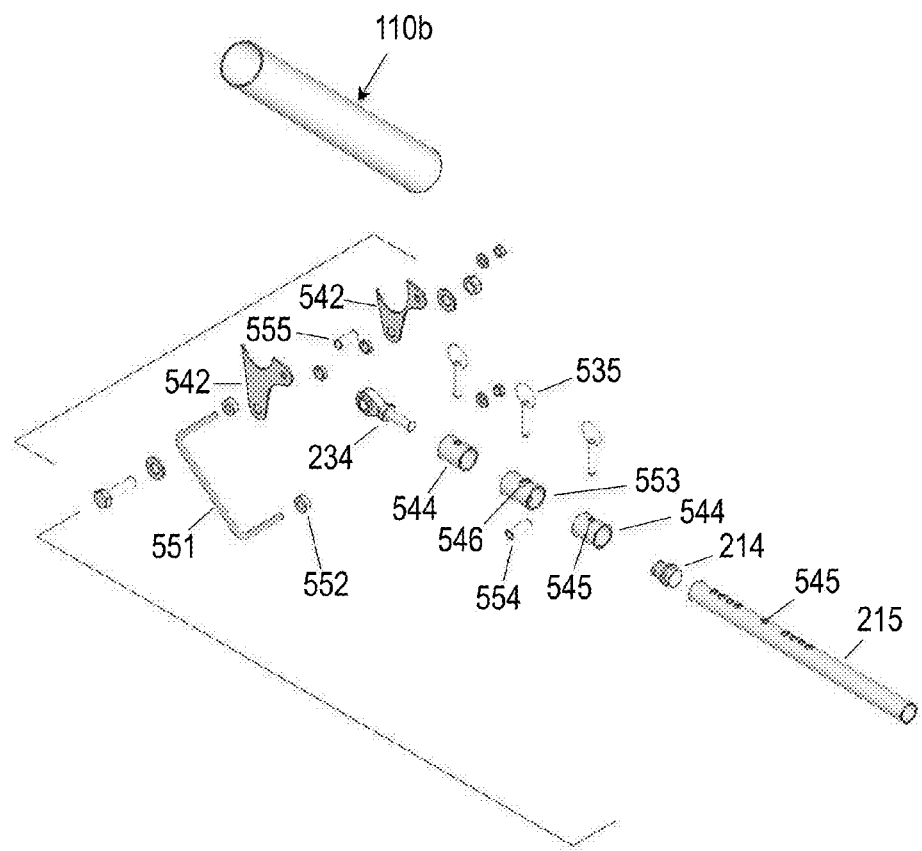
FIG. 5I shows an example of a spring steel "C" wire and concentric sleeve embodiment of the link bar pivoted joint connection in exploded view in accordance with the principles of the present disclosure.

DETAILED DESCRIPTION OF THE SPRING STEEL "C" WIRE AND CONCENTRIC SLEEVE PIVOT JOINT EMBODIMENT—FIGS. 5H and 5I FIG. 5H shows the spring steel "C" wire and concentric sleeve link bar pivot embodiment 550 in perspective view.

FIG. 5I shows the spring steel "C" wire and concentric sleeve link bar pivot joint embodiment 550 in exploded view. Said spring steel "C" wire and concentric sleeve link bar pivot joint embodiment is similar in construction to the spring steel strip and concentric sleeve link bar pivot embodiment 540 except for the use of the round spring rod 551 bent in a "C" shape instead of the spring steel strips 541, shaft collars 552 are provided to keep the spring steel "C" wire 551 in place, the sliding collar bushing 554 is attached under the sliding collar 553, and the bushing spacer 555 provides support between the tabs 542. All other components are as described earlier.

Operation of the Spring Steel "C" Wire Pivot Joint Embodiment in FIGS. 5H and 5I The spring steel "C" wire 551 provides bending resistance to minimize the rotation of the link bar 210b in the horizontal plane and thereby limit to small displacements the surging forward or lagging behind motion of each bicycle in relation to the other during acceleration or braking. The combination of the spring steel "C" wire 551 with horizontal attachment points at both ends, a bolt on the top end and the bushing 554 attached to the bottom sliding collar 553 on the other end, allows for rotation of the link bar 210b on the vertical plane and thereby allows for leaning of the side by side twin bicycle assemblage.

The fixed collars 544 attached to the link bar tube 215 serve as mechanical stops for the sliding collar 553 to limit the maximum sideways inclination in either direction by allowing the sliding collar 553 to slide on the link bar tube 215 until the sliding collar 553 reaches either of the fixed collars 544. The quick release pins 535 renders the assemblage rigid as it relates to leaning when said quick release pins are inserted through the slot 546 on the sliding collar 553 and the hole 545 on the link bar 210b to allow riding the side-by-side flexible twin bicycle assemblage in a vertically rigid mode.

The slot 546 on the sliding collar 553 allows for rotation of the link bar 210b around its centerline axis thereby allowing the side-by-side twin bicycle assemblage to rotate around its transverse axis to accommodate for bumps or hollows on the path of each individual bicycle.

Figure 5J:
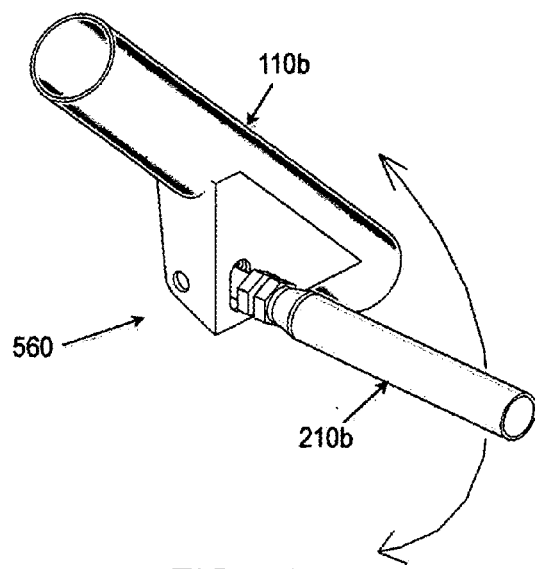
FIG. 5J shows an example of a "T" joint embodiment of the link bar pivoted joint connection in perspective view in accordance with the principles of the present disclosure.
Figure 5K:
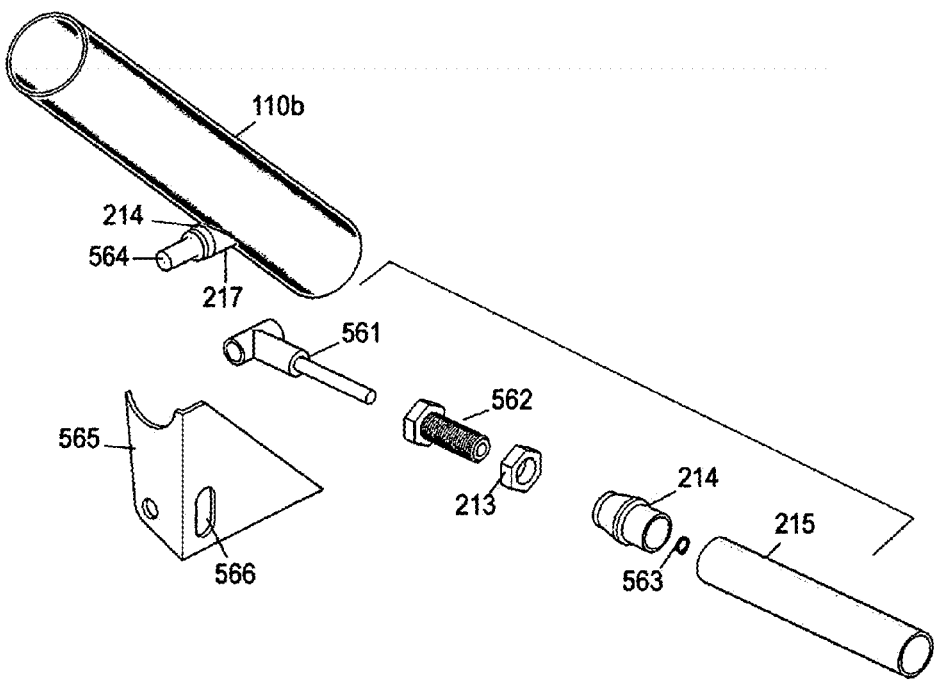
FIG. 5K shows an example of a "T" joint embodiment of the link bar pivoted joint in exploded view in accordance with the principles of the present disclosure.

DETAILED DESCRIPTION OF THE "T" PIVOT JOINT EMBODIMENT IN—FIGS. 5J and 5K

FIG. 5J shows the "T" joint 560 embodiment for the link bars pivots in perspective view.

FIG. 5K shows the "T" joint 560 pivot embodiment for the link bars in exploded view. Said "T" joint pivot embodiment is composed of the butted bushing 217 attached to the bicycle frame, the threaded insert 214 attached to said butted bushing, the support bolt 564, the "T" joint bolt 561, the hollow bolt 562, the lock nut 213, the external retaining ring 563, and the "L" support tab 565 fitted with slot 566. The "T" joint bolt 561 is inserted into the hollow bolt 562 and secured in place with the external retaining ring 563. The hollow bolt 562 is attached to the threaded insert 214 of the link bar 210b and locked in place with lock nut 213.

Operation of the "T" Pivot Joint Embodiment in FIGS. 5J and 5K

The slot 566 on "L" support tab 565 provides a mechanical stop to minimize the rotation of the link bar 210b in the horizontal plane and thereby limit to small displacements the surging forward or lagging behind motion of each bicycle in relation to the other during acceleration or braking while allowing for rotation of the link bar 210b on the vertical plane and thereby allowing for leaning of the side by side twin bicycle embodiment. The ends of the slot 566 serve as mechanical stops to limit the maximum sideways inclination in either direction. The "T" bolt 561 inserted through the hollow bolt 562 and secured with the external retaining ring 563 allows for rotation of the link bar 210b around its centerline axis thereby allowing the side-by-side twin bicycle assembly to rotate around its transverse axis to accommodate for bumps or hollows on the path of each individual bicycle.

Figure 5L:
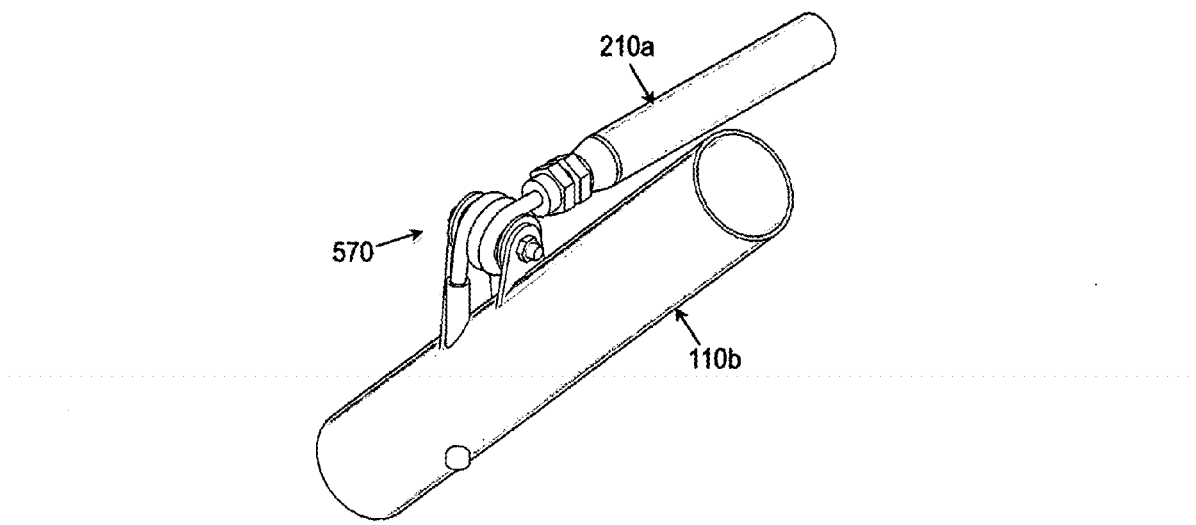
FIG. 5L shows an example of a torsion spring joint embodiment of the link bar pivoted joint connection in perspective view in accordance with the principles of the present disclosure.
Figure 5M:
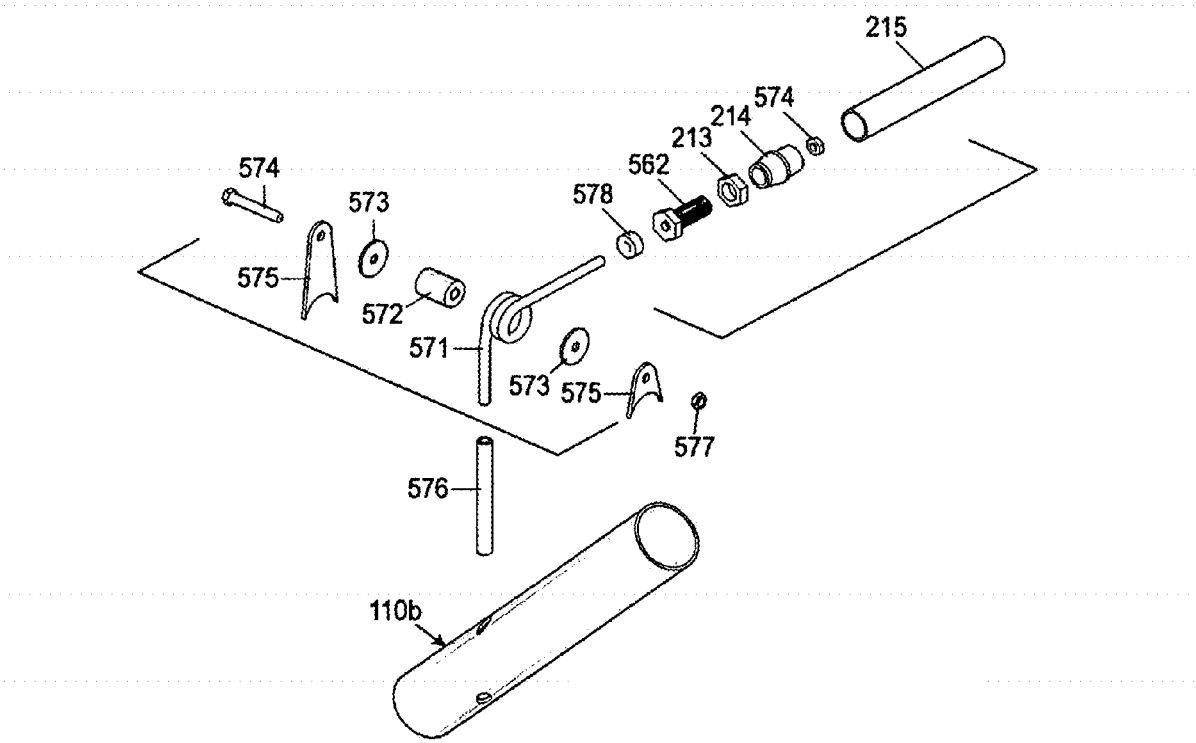
FIG. 5M shows an example of a torsion spring joint embodiment of the link bar pivoted joint connection in exploded view in accordance with the principles of the present disclosure.

DETAILED DESCRIPTION OF THE TORSION SPRING PIVOT JOINT EMBODIMENT—FIGS. 5L and 5M FIG. 5L shows the torsion spring pivot joint embodiment 570 for the link bars in perspective view.

FIG. 5M shows the torsion spring pivot joint embodiment 570 for the link bars in exploded view. Said torsion spring pivot joint embodiment is composed of support tabs 575, attached to the bicycle frame, the spring retaining bushing 576 attached to a perforation on the bicycle frame, bolt 574, torsion spring support tabs 575, spring retaining washers 573, bushing 572, torsion spring 571 and nut 577 on the bicycle frame side, the spring retaining shaft collar 578, hollow bolt 562, locknut 213, threaded insert 214, nut 574 and link bar tube 215. The bicycle frame end of the torsion spring 571 is secured in place by inserting its end into the spring retaining bushing. The link bar end of the torsion spring 571 is inserted into the hollow bolt 562 and secured in place with the spring retaining shaft collar 578 and nut 574. The hollow bolt 562 is attached to the threaded insert 214 of the link bar 210b and locked in place with lock nut 213.

Operation of the Torsion Spring Pivot Joint Embodiment in FIGS. 5L and 5M

The torsion spring 571 provides bending resistance to minimize the rotation of the link bar 210b in the horizontal plane and thereby limit to small displacements the surging forward or lagging behind motion of each bicycle in relation to the other during acceleration or braking while allowing for rotation of the link bar 210b on the vertical plane and thereby allowing for leaning of the side by side twin bicycle embodiment. The resistance that the compression spring offers to rotation of the link bar 210b on the vertical plane is inversely proportional to the number of loops in the spring and much lower than the resistance to the rotation in the horizontal plane.

The internal diameter of the torsion spring is reduced as the spring is twisted in the direction of the winding until it reaches bushing 572 which then serves as the mechanical stop to limit the maximum sideways inclination in either direction.

The torsion spring 571 leg inserted through the hollow bolt 562 and retained by nut 574 allows for rotation of the link bar 210b around its centerline axis thereby allowing the side-by-side twin bicycle assemblage to rotate around its transverse axis to accommodate for bumps or hollows on the path of each individual bicycle.

DETAILED DESCRIPTION OF THE BOX PIVOT JOINT EMBODIMENT—FIG. 5N

Figure 5N:
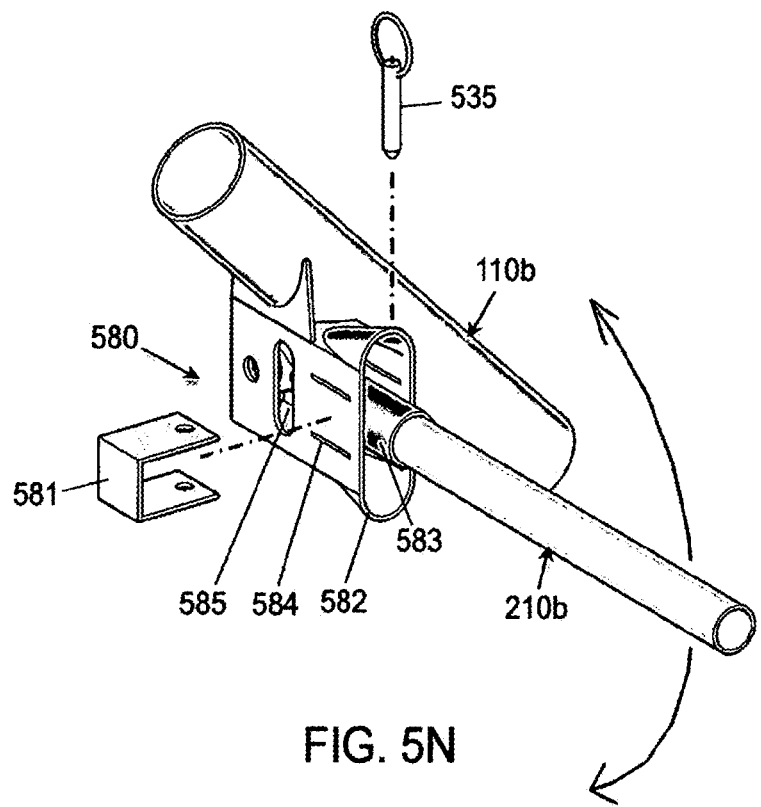
FIG. 5N shows an example of a boxed joint embodiment of the link bar pivoted joint connection in perspective view in accordance with the principles of the present disclosure.

FIG. 5N shows the box pivot joint embodiment 580 for the link bars in perspective view. Said box pivot joint embodiment is composed of box joint support 582 attached to the bicycle frame, the link bar protective sleeve 583, the "C" clip 581 and the quick release pin 535. Other link bar components are similar to those described under FIG. 2F option with spherical rod end bearing 234.

Operation of the Box Pivot Joint Embodiment in FIG. 5N

The vertical rectangular shape of the box joint support 582 provides a mechanical stop to minimize the rotation of the link bar 210b in the horizontal plane and thereby limit to small displacements the surging forward or lagging behind motion of each bicycle in relation to the other during acceleration or braking while allowing for rotation of the link bar 210b on the vertical plane and thereby allowing for leaning of the side by side twin bicycle assemblage.

The rounded ends of the box joint support 582 serve as mechanical stops to limit the maximum sideways inclination in either direction. The "C" clip 581 renders the assemblage rigid as it relates to leaning when said "C" clips are inserted into slots 584 in the box joint support 582 and secured in place with the quick release pin 535 to allow riding the side-by-side twin bicycle assemblage in a vertically rigid mode.

The spherical rod end bearing 234, hidden from view by the box joint support 582, allows for rotation of the link bar 210b around its centerline axis thereby allowing the side-by-side flexible twin bicycle assemblage to rotate around its transverse axis to accommodate for bumps or hollows on the path of each individual bicycle.

The wrench slot 585 allows for a wrench to reach the link bar 210b lock nut 213 that is not visible in the figure. The protective sleeve 583, made of plastic, rubber or any other suitable material, prevents metal-to-metal contact between the box joint support 582 and the link bar 210b.

DETAILED DESCRIPTION OF THE TABS AND STOPS PIVOT JOINT EMBODIMENT—FIG. 5O

Figure 5O:
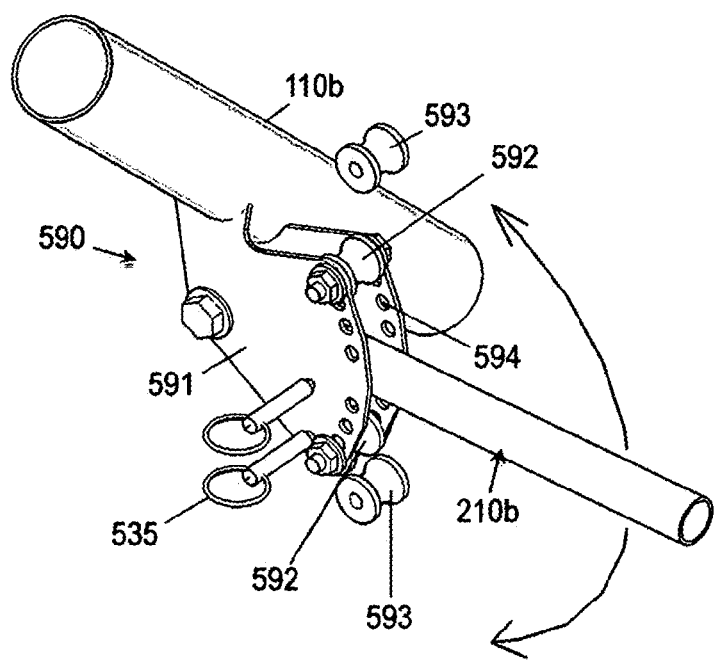
FIG. 5O shows an example of the tabs and stops joint embodiment of the link bar pivoted joint connection in perspective view in accordance with the principles of the present disclosure.
Figure 5P:
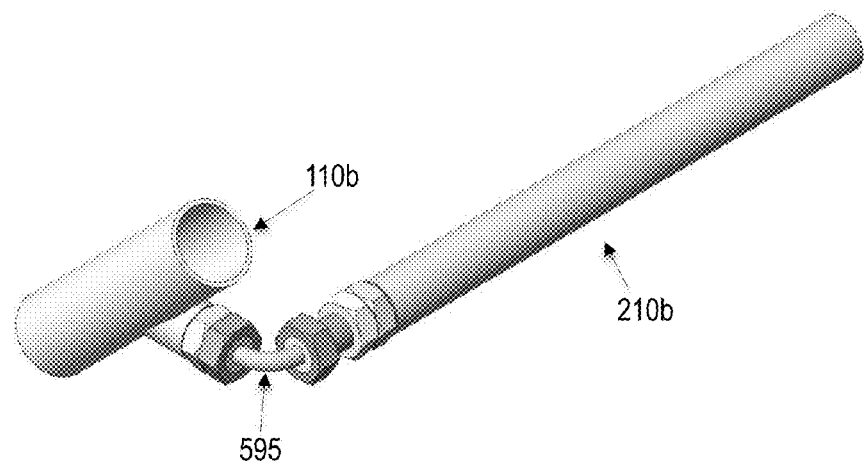
FIG. 5P shows the "spring steel L" joint" embodiment 595 for the link bars in perspective view in accordance with the principles of the present disclosure.

FIG. 5O shows the tabs and stops pivot joint embodiment 590 for the link bars in perspective view. Said tabs and stops pivot joint embodiment is composed of tabs joint supports 591 attached to the bicycle 110b frame, fixed bushings 592, movable bushings 593 and quick release pins 535. Other link bar components are similar to those described previously.

Operation of the Tabs and Stops Pivot Joint Embodiment in FIG. 5O

The vertical rectangular shape of the tabs pivot joint support 591 provides a mechanical stop to minimize the rotation of the link bar 210b in the horizontal plane and thereby limit to small displacements the surging forward or lagging behind motion of each bicycle in relation to the other during acceleration or braking while allowing for rotation of the link bar 210*b* on the vertical plane and thereby allowing for leaning of the side by side twin bicycle assemblage.

The fixed bushings 593, attached at the extreme ends between tabs 591, serve as mechanical stops to limit the maximum sideways inclination in either direction. The movable bushings 592 can be attached with the quick release pins 535 in a number of intermediate quick release pin orifice positions 594 to serve as mechanical stops to reduce the range of the sideways inclination. When said movable bushings 592 are installed at the quick release pin orifice positions 594 nearest position to link bar 210*b* they render the assemblage rigid as it relates to sideways leaning motion.

The spherical rod end bearing 234, hidden from view by the tabs joint supports 591, allows for rotation of the link bar 210*b* around its centerline axis thereby allowing the side-by-side flexible twin bicycle assemblage to rotate around its transverse axis to accommodate for bumps or hollows on the path of each individual bicycle.

DETAILED DESCRIPTION OF THE "SPRING STEEL "L" JOINT" EMBODIMENT—FIGS. 5P, 5Q, 5R and 5S FIG. 5P shows the "spring steel "L" joint" embodiment for the link bars in perspective view.

Figure 5Q:
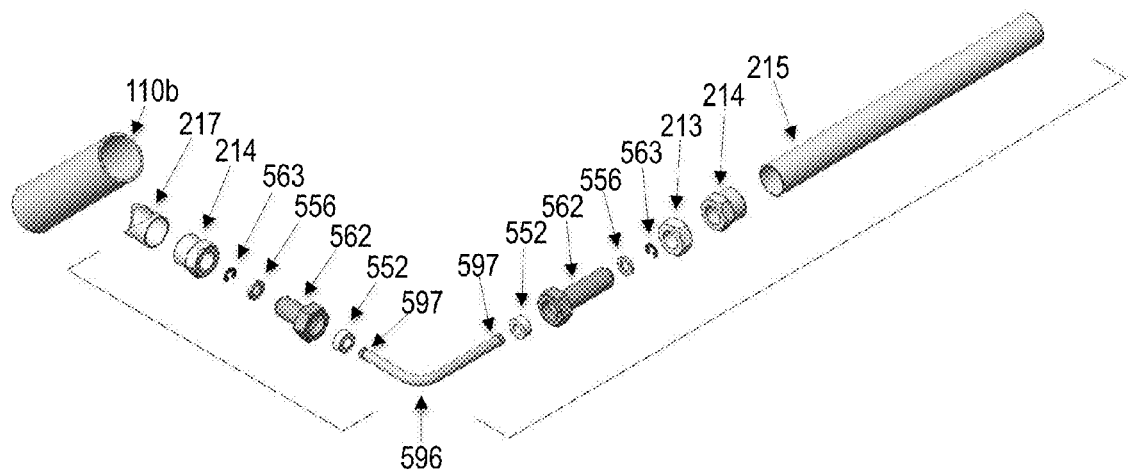
FIG. 5Q shows the "spring steel "L" joint" embodiment for the link bars in exploded view in accordance with the principles of the present disclosure.

FIG. 5Q shows the "spring steel "L" joint" embodiment 595 for the link bars in exploded view. Said "L" joint pivot embodiment is composed of the butted bushing 217 attached to the bicycle frame, the threaded insert 214 attached to said butted bushing, the fixed collars 552, that are inserted and secured on the "L" shaped spring steel member 596, which is inserted into the hollow bolts 562 and is secured in place with washers 552 and the external retaining rings 563 that are pressed into grooves 597 on the "L" shaped spring steel member 596. The spring steel "L" joint 595 is attached to the threaded inserts 214 of the link bar 210*b* and locked in place with lock nut 213.

Figure 5R:
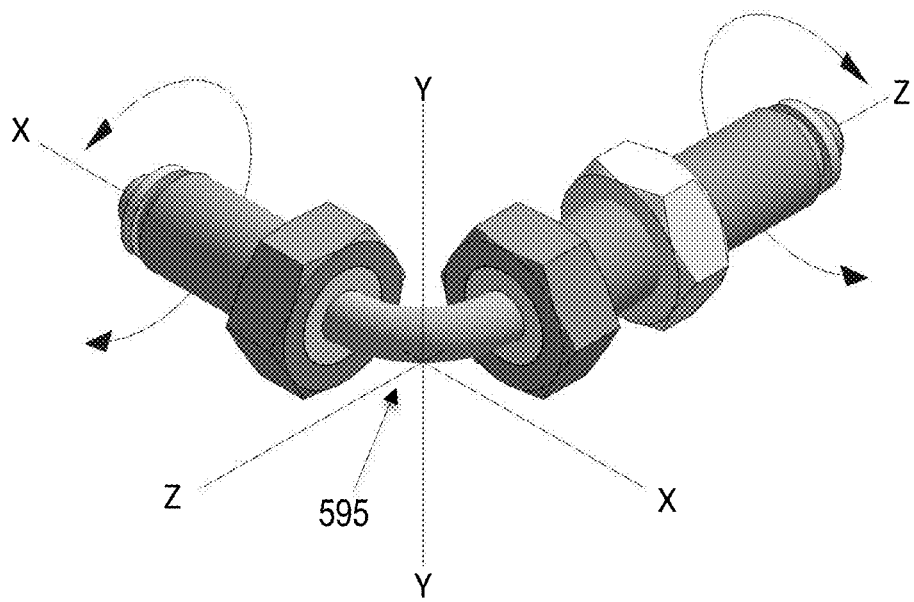
FIG. 5R shows the perspective view of the "spring steel "L" joint including the reference axes to describe rotational movements of said joint in accordance with the principles of the present disclosure.

FIG. 5R shows the axes of rotation X, and Z of the "spring steel "L" joint" embodiment where said rotation axes are parallel to the respective axes of rotation Xa and Xb and Z in FIG. 3A.

Figure 5S:
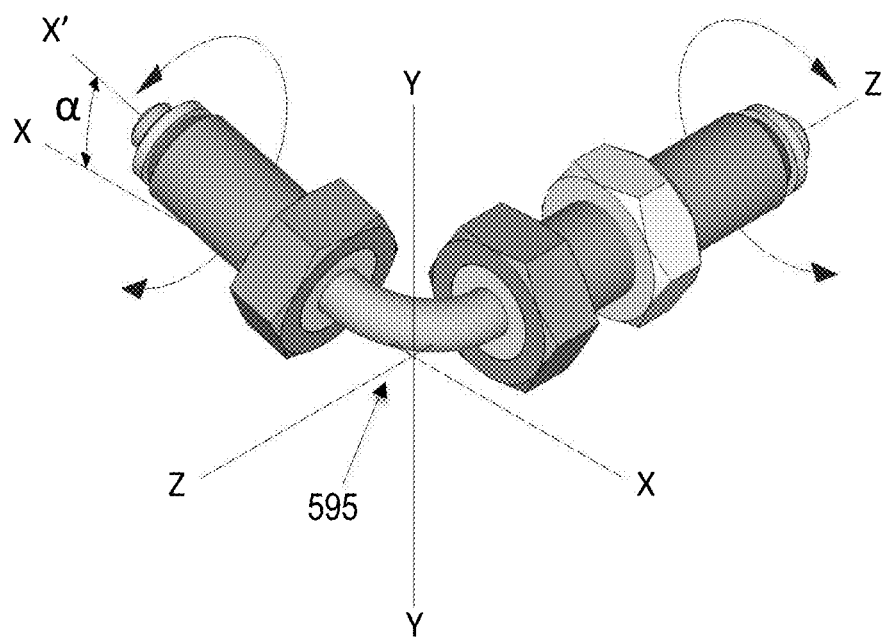

FIG. 5S shows the axis of rotation X' displaced at an angle α between in relation to axis X of the "spring steel "L" joint" embodiment.
Operation of the "Spring Steel "L" Joint" Embodiment in FIG. 5P, FIG. 5Q, FIGS. 5R and 5S.

The fixed collars 552, the washers 552 and the external retaining rings 563 secure the "L" shaped spring steel member 596 in a fixed position while allowing rotation around the X and Z axes of the joint and limiting the undesired rotation around the Y axis of the joint.

Rotation around the Z axis of each of the "L" shaped spring steel members 596 of the link bars 210*a*, 210*b*, 210*c* and 210*d* allows the vehicle to lean sideways. Rotation around the X axis of each of the "L" shaped spring steel members 596 of the link bars 210*a*, 210*b*, 210*c* and 210*d* allows the vehicle to rotate around its transverse axis to conform to differences in bumps or hollows on each individual bicycle riding path. The combined resistance of the "L" shaped spring steel members 596 of the link bars 210*a*, 210*b*, 210*c* and 210*d* limit the undesired rotation around the Y axis of the joint and dampen the jolts that may result from sudden acceleration or braking from one individual bicycle in relation to the other.

Making reference to FIG. 5S, rotation around the X' axis of each of the "L" shaped spring steel members 596 of the link bars 210*a*, 210*b*, 210*c* and 210*d* allows the vehicle to lean sideways and provides increasing resistance to rotation limiting the maximum angle of inclination of the vehicle as a function of the magnitude of angle α and the resistance of the "L" spring.

DETAILED DESCRIPTION OF THE COMBINED BRAKES EMBODIMENT—FIGS. 6A AND 6B

Figure 6A:
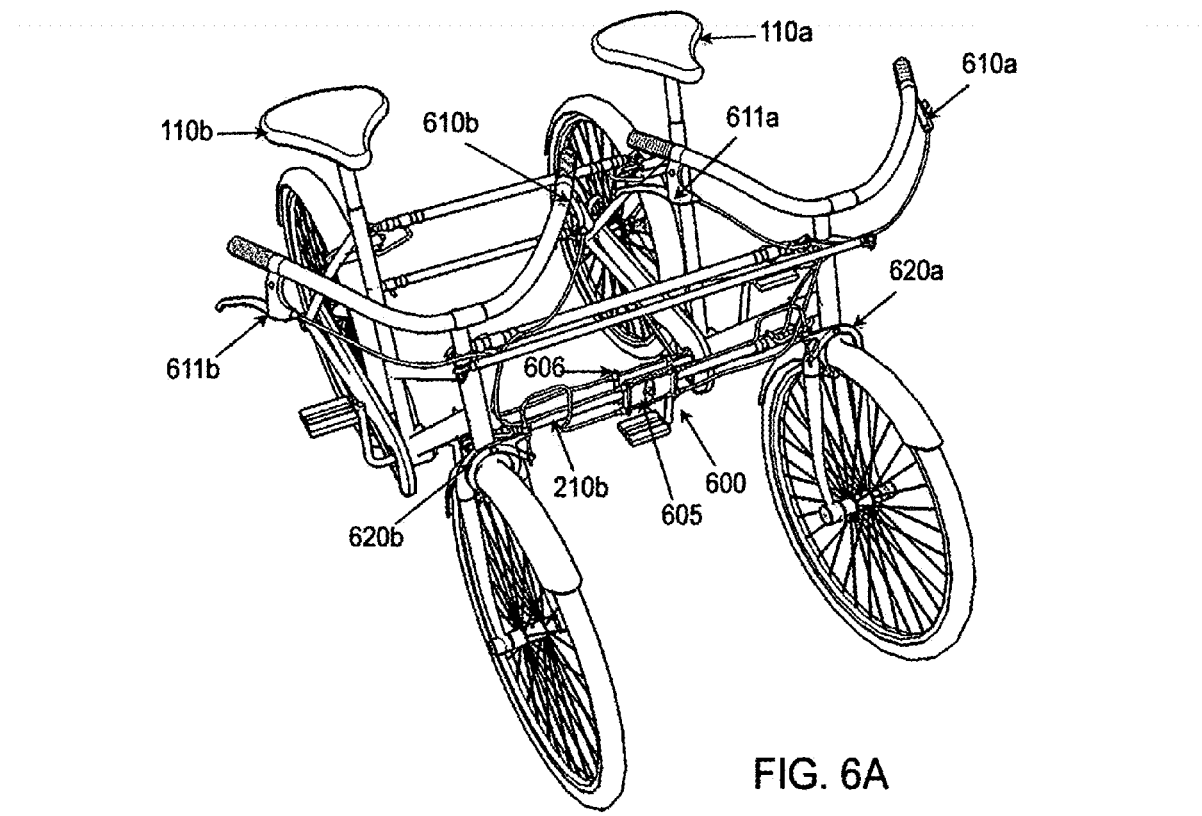
FIG. 6A shows an alternate embodiment of the side-by-side flexible twin bicycle further including an example of a combined brake assemblage in accordance with the principles of the present disclosure.

FIG. 6A shows a front perspective view of an alternate embodiment of the side-by-side flexible twin bicycle with combined brakes. Said combined brakes embodiment is composed of combined brakes assembly box 600, shown as an example attached to front bottom link bar 210*b*, brake levers 610*a* and 610*b* for the front wheels brakes, brake levers 611*a* and 611*b* for the rear wheels brakes, and the associated brake cables. The combined brakes assemblage box 600 is composed of front wheels brakes assemblage box 605 and rear wheels brakes assemblage box 606.

Figure 6B:
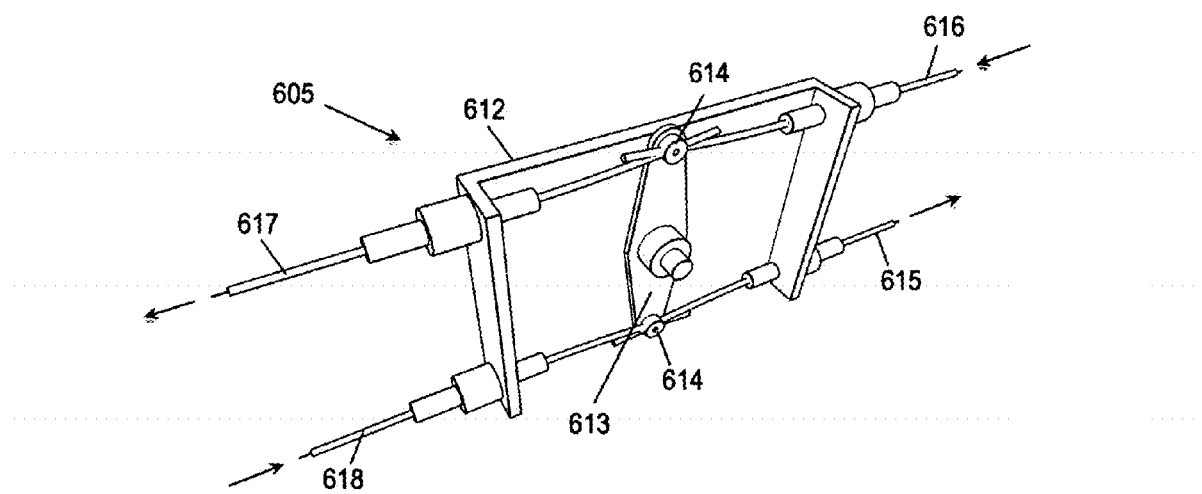
FIG. 6B shows an example of a combined brake assemblage lever box for the front tires in accordance with the principles of the present disclosure.

FIG. 6B shows a perspective view of the front brake assembly box 605. Said front brakes assemblage box is composed of the brake box base 612, front brakes lever 613, brake cables retaining screws 614, brake cable 615 connected to the front wheels brake lever 610*a* on the left side bicycle 110*a*, brake cable 616 connected to the front wheel brake caliper 620*a* of the left bicycle 110*a*, brake cable 617 connected to the front wheels brake lever 610*b* on the right side bicycle 110*b*, and brake cable 618 connected to the front wheel brake caliper 620*b* of the right bicycle 110*b*. Brake cables 616 and 617 are connected to one side of the brake box crank 613 with a brake cable retaining screw 614 and brake cables 615 and 618 are connected to the other side of the brake box crank 613 with a second brake cable retaining screw 614.

The rear brakes assemblage box 606, not shown in detail, is similar to the front brake assemblage box except that it is actuated from brake levers 611*a* and 611*b*, and in a similar fashion actuates on the brake calipers of the rear wheels.
Operation of the Combined Brakes Embodiment The combined brakes embodiment allows for either or both riders to have, individually or simultaneously, control of the assemblage brakes and to apply brakes to the assemblage front and rear wheels of the side-by-side twin bicycles in a similar manner as when riding a single bicycle.

Applying pressure the front wheels brake lever 610*a* on the left side bicycle 110*a* will pull brake cable 615 connected to the brake box lever 613 which will rotate and pull both brake cables 616 and 618 which in turn will activate the front wheel brake caliper 620*a* of the left bicycle 110*a* and the front wheel brake caliper 620*b* of the left bicycle 110*b*. Applying pressure the front wheels brake lever 610*b* on the right side bicycle 110*b* will result in the same action.

The rear brakes assembly box 606, not shown in the figures, is similar to the front brakes assembly box 605 and operates the rear wheels brake calipers in an analogous manner.

DETAILED DESCRIPTION SIDE-BY-SIDE FLEXIBLE TWIN (TANDEM) BICYCLE—FIG. 7A

Various aspects described or referenced herein may be directed to different embodiments of an inventive side-by-side flexible twin cycle having various features as illustrated and described and/or referenced herein.

Figure 7A:
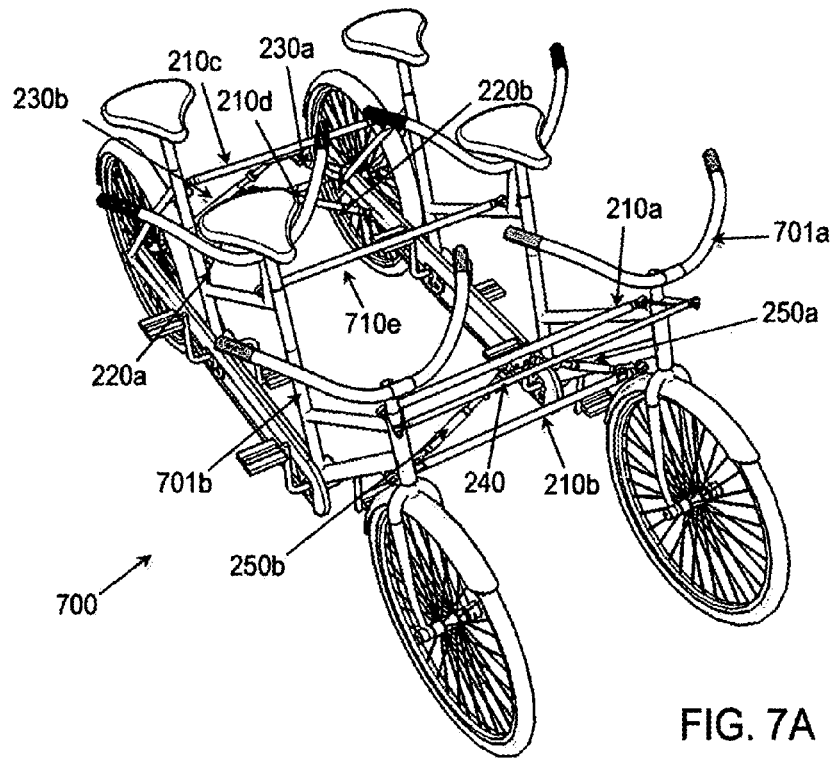
FIG. 7A shows an example of an alternate embodiment of the side-by-side flexible twin bicycle comprising two tandem bicycles in accordance with the principles of the present disclosure.

FIG. 7A shows a front perspective view of an embodiment of the side-by-side flexible twin bicycle related to an assemblage 700 consisting of two side-by-side tandem bicycles able to accommodate four riders. Six link bars connect the left side tandem bicycle 701a and the right side tandem bicycle 701b of this embodiment. Said link bars are the front top link bar 210a, the front bottom link bar 210b, the rear top link bar 210c, the rear bottom link bar 210d, the middle link bar 710e, and the steering link bar 240. The horizontal diagonal link bars 220a and 220b provide longitudinal stability. Four concentric bars, the rear vertical diagonal bars 230a and 230b and the front vertical diagonal bars 250a and 250b provide vertical stability.

Operation—Side-by-Side Flexible Twin Tandem Bicycle

The manner of operation of the side-by-side flexible twin tandem bicycle is similar to that of the side-by-side flexible twin bicycle discussed earlier.

Figure 7B:
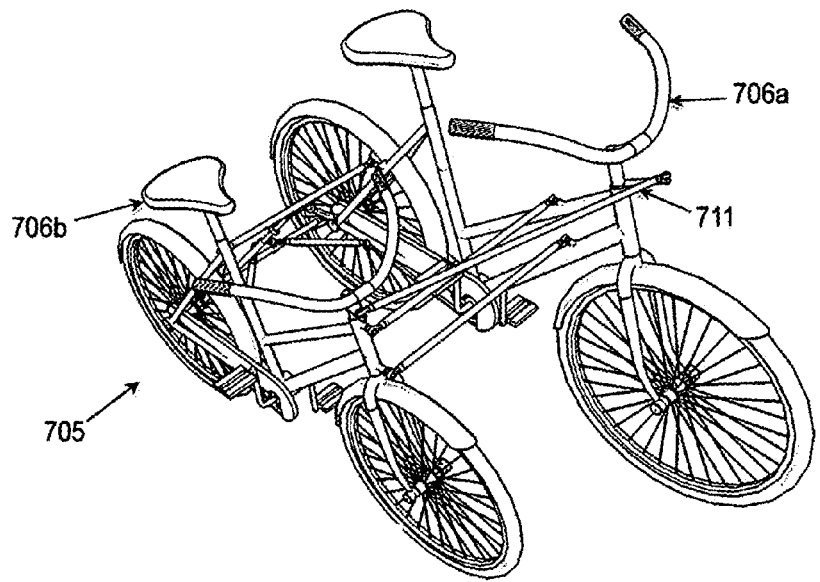
FIG. 7B shows an example of an alternative embodiment of the side-by-side flexible twin bicycle comprising two bicycles of different sizes in accordance with the principles of the present disclosure.

DETAILED DESCRIPTION OF THE SIDE-BY-SIDE FLEXIBLE TWIN BICYCLE WITH BICYCLES OF DIFFERENT SIZES—FIG. 7B

Various aspects described or referenced herein may be directed to different embodiments of an inventive side-by-side flexible twin cycle having various features as illustrated and described and/or referenced herein.

An embodiment of the side-by-side flexible twin bicycle shown in FIG. 7B in front perspective view relates to an assemblage 705 consisting of two side-by-side bicycles of different sizes to be able to accommodate an adult rider and a child rider. Four link bars connect the large left side bicycle 706a and the small right side bicycle 706b, horizontal diagonal link bar(s) provide longitudinal stability, vertical diagonal link bar(s) provide vertical stability, and the steering link bar 711 coordinates the steering of the assemblage as a unit in a similar fashion to previously explained embodiments.

Operation—Side-by-Side Flexible Twin Bicycle with Bicycles of Different Sizes

The manner of operation of the side-by-side flexible twin bicycle with bicycles of different sizes is similar to that of the side-by-side flexible twin bicycle discussed earlier.

Figure 7C:
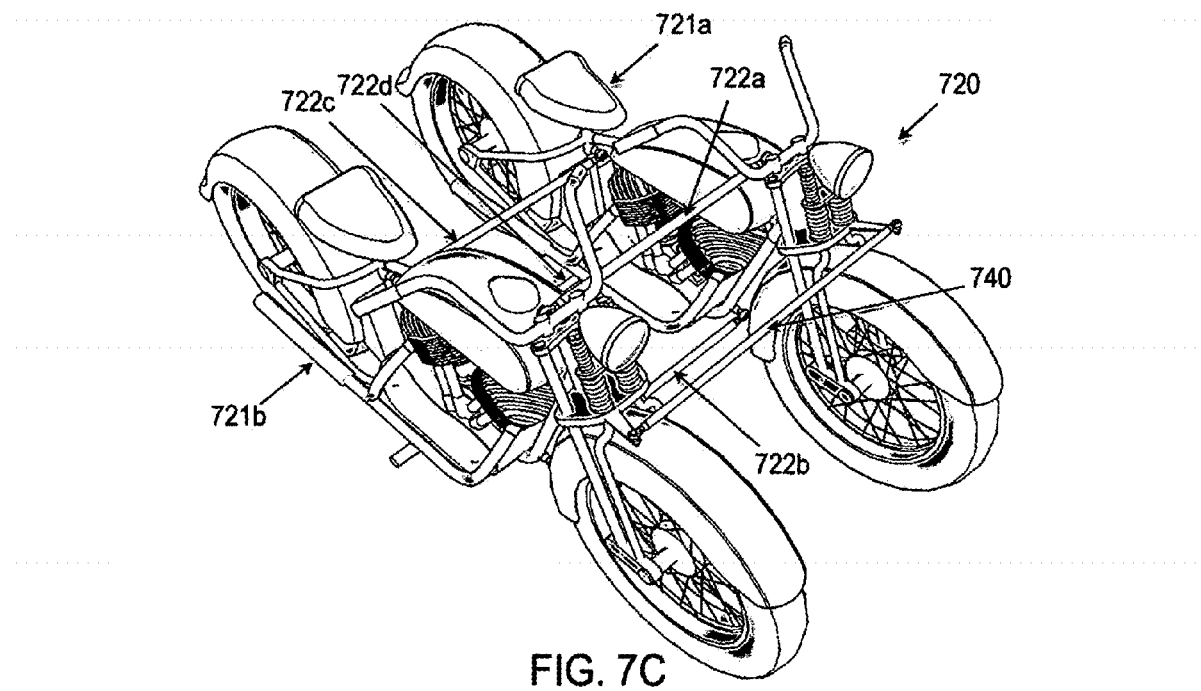
FIG. 7C shows an example of an alternate embodiment of the side-by-side flexible twin bicycle comprising two motorcycles in accordance with the principles of the present disclosure.
Figure 7D:
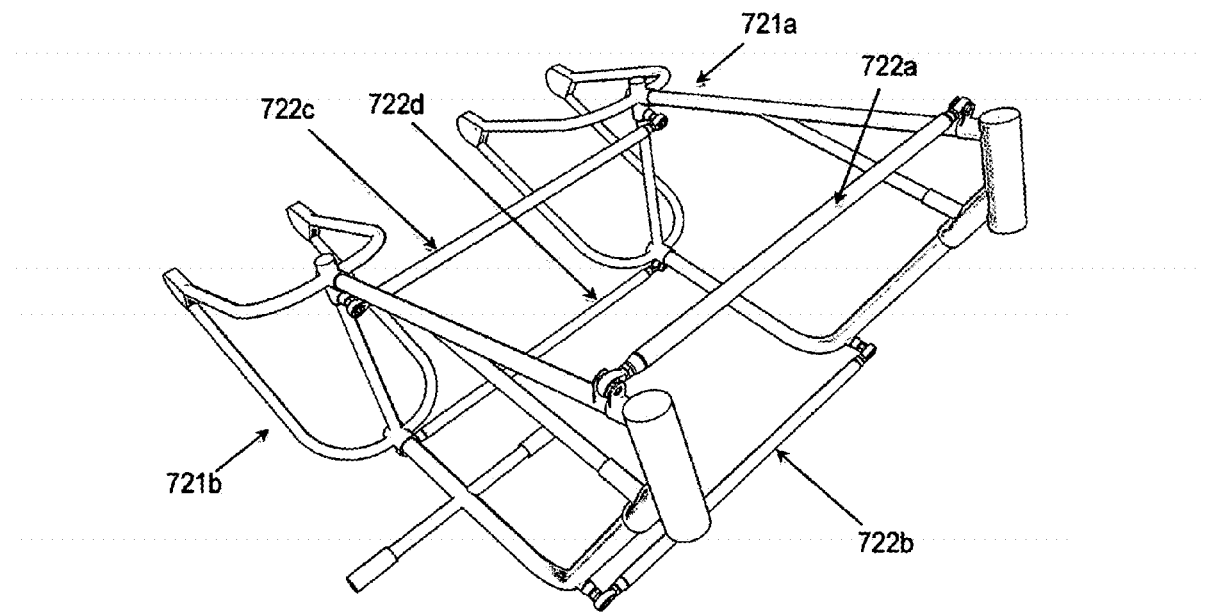
FIG. 7D shows the frames of the example of an alternate embodiment of the side-by-side flexible twin bicycle comprising two motorcycles of the embodiment in FIG. 7c omitting other components of the motorcycles for clarity in accordance with the principles of the present disclosure.

DETAILED DESCRIPTION SIDE-BY-SIDE FLEXIBLE TWIN MOTORCYCLE EMBODIMENT—FIGS. 7C and 7D Various aspects described or referenced herein may be directed to different embodiments of an inventive side-by-side flexible twin motorcycle having various features as illustrated and described and/or referenced herein.

An embodiment of the side-by-side flexible twin motorcycle 720, shown in FIG. 7C in front perspective view, relates to an assemblage consisting of two side-by-side motorcycles. FIG. 7C shows five link bars connecting the left side motorcycle 721a and the right side motorcycle 721b of this embodiment. Said link bars are the upper front link bar 722a, the lower front link bar 722b, the upper rear link bar 722c, the lower rear link bar 722d and the steering link bar 740. Horizontal diagonal link bar(s) and vertical diagonal bar(s), not shown in FIG. 7C, provide longitudinal stability and vertical stability in a similar fashion to previously explained embodiments. The steering link bar 740 coordinates the steering of the assemblage as a unit in a similar fashion to previously explained embodiments.

FIG. 7D shows the frames of the motorcycles 721a and 721b, and the four link bars 722a, 722b, 722c and 722d. It is to be noted that contrary to bicycles, where the lower rear link bar has to be located further to the rear to avoid interference with the pedal mechanism, the lower rear link bar 722d of the twin motorcycle embodiment can be located ahead of the rear tires in a position that permits all pivot joint locations to fall on the vertical centerline plane of the motorcycles if desired.

The twin motorcycle assemblage can employ any of the alternative pivoted joint embodiments described above including horizontal diagonal bar(s) projecting backwards from the lower rear link bar 722d to the chain stay tubes and vertical diagonal bar(s) between the front link bars 722a and 722b, and between the rear link bars 722c and 722d.

Operation—Side-by-Side Flexible Twin Motorcycle

The manner of operation of the side-by-side flexible twin motorcycle is similar to that of the side-by-side flexible twin bicycle embodiments discussed earlier. Coordination of the brake systems, both hydraulic and cable, can be analogous to the combined brake embodiment discussed above, except that in the case of an hydraulic brake system it would consist of combination of hydraulic lines. Coordination for acceleration and shifting can also be combined employing electro-mechanical components.

The invention claimed is:

1. A side-by-side flexible structure for adjacent vehicles comprising:
 at least two adjacent vehicles comprising a first vehicle and a second vehicle,
 wherein said first vehicle comprises a first vehicle frame, a first steering mechanism;
 wherein said second vehicle comprises a second vehicle frame and a second steering mechanism;
 a coupling frame comprising a plurality of linking bars,
 wherein said coupling frame attaches said at least two adjacent vehicles adjacent to each other,
 wherein said plurality of liking bars comprises a upper front link bar, a lower front link bar, a upper rear link bar, a lower rear link bar, a steering link bar;
 wherein said steering link bar comprises a first steering end mechanically coupled to the first steering mechanism, a second steering end mechanically coupled to the second steering mechanism;
 a plurality of mechanical articulating joints comprising a first mechanical articulating joint, a second mechanical articulating joint, a third mechanical articulating joint, a fourth mechanical articulating joint, a fifth mechanical articulating joint, a sixth mechanical articulating joint, a seventh mechanical articulating joint, a eight mechanical articulating joint a first steering mechanical articulating joint and a second steering mechanical articulating joint,
 wherein each mechanical articulating joint from said plurality of mechanical articulating joints comprises a first adjustable inclination angle mechanism;
 wherein said first steering end is mechanically coupled to the first steering mechanism by the first steering mechanical articulating joint, and wherein said second steering end is mechanically coupled to the second steering mechanism by the second steering mechanical articulating joint; and at least one horizontal diagonal bar and at least one vertical diagonal bar,
 wherein said at least one vertical diagonal bar comprises an inclination angle adjustable mechanism;
 wherein said at least one vertical diagonal bar comprises a vertical proximal end and a vertical distal end,
 wherein said vertical proximal end comprises a vertical proximal articulating joint;

wherein said vertical distal end comprises a distal vertical articulating joint, wherein said vertical proximal articulating joint is mechanically coupled to the first vehicle and said distal vertical articulating joint is mechanically coupled to the second vehicle; and wherein said at least a horizontal diagonal bar comprises an horizontal proximal end and an horizontal distal end, wherein said horizontal proximal end comprises a horizontal proximal articulating joint; wherein said horizontal distal end comprises a horizontal distal articulating joint; wherein said horizontal proximal articulating joint is mechanically coupled to the first vehicle and said horizontal distal articulating joint is mechanically coupled to the second vehicle.

2. The side-by-side flexible structure for adjacent vehicles of claim 1, wherein said lower front link bar comprises an second inclination angle adjustable mechanism.

3. The side-by-side flexible structure for adjacent vehicles of claim 1, comprising a combined brake assembly.

4. The side-by-side flexible structure for adjacent vehicles of claim 1, wherein said two adjacent vehicles are selected from a variety of vehicles including different size bicycles, in-line multi-rider tandem bicycles and motorcycles.

5. The side-by-side flexible structure for adjacent vehicles of claim 1, wherein said first mechanical articulating joint comprises a first spherical rod end bearing.

6. The side-by-side flexible structure for adjacent vehicles of claim 1, wherein said first mechanical articulating joint comprises a butted bushing attached to the first vehicle frame, a smooth bore insert attached to the butted bushing and a quick release lock pin.

7. The side-by-side flexible structure for adjacent vehicles of claim 1, wherein said first mechanical articulating joint comprises at least a spring steel strip and concentric sleeve link bar embodiment, wherein said concentric sleeve link bar comprises:
    a sliding collar,
    at least a fixed collar,
    a link bar tube comprising a hole,
    a quick release pin,
    a spherical rod end bearing,
    a threaded insert,
    at least one support tab attached to the first vehicle frame;
    wherein said spring steel strips includes a first end mechanically coupled on one end to the support tab and a second end mechanically coupled at the other end to the sliding collar;
    wherein the fixed collars is mechanically coupled to the link bar tube, and the spherical rod end bearing are mechanical coupled to the threaded insert.

8. The side-by-side flexible structure for adjacent vehicles of claim 1, wherein said first mechanical articulating joint comprises at least a wire spring and concentric sleeve link bar embodiment, wherein said concentric sleeve link bar comprises:
    a sliding collar,
    at least a fixed collar,
    a link bar tube comprising a hole,
    a quick release pin,
    a spherical rod end bearing,
    a threaded insert,
    at least one support tab attached to the first vehicle frame;
    wherein said wire spring includes a first end mechanically coupled on one end to the support tab and a second end mechanically coupled at the other end to the sliding collar;
    wherein the fixed collars is mechanically coupled to the link bar tube, and the spherical rod end bearing are mechanical coupled to the threaded insert.

9. The side-by-side flexible structure for adjacent vehicles of claim 1, wherein said first mechanical articulating joint comprises:
    a butted bushing attached to the first vehicle frame,
    a threaded insert attached to the butted bushing,
    a T joint bolt inserted into a hollow bolt and secure in place with a retaining ring,
    a support bolt,
    a L housing support tab including a slot;
    wherein said T joint bolt extends away said L housing support tab.

10. The side-by-side flexible structure for adjacent vehicles of claim 1, wherein said first mechanical articulating joint comprises:
    a torsion spring,
    at least a support tab attached to said first frame,
    a spring retaining bushing,
    a sprint retaining collar,
    a hollow bolt,
    an angle limitation element,
    wherein said torsion spring is secured to said first vehicle frame by said spring retaining bushing, and
    wherein said angle limitation element is surround by the torsion spring.

11. The side-by-side flexible structure for adjacent vehicles of claim 1, wherein said first mechanical articulating joint comprises:
    a box joint support including at least 2 slots, wherein said box joint support is attached to said first vehicle frame,
    a link bar protective sleeve,
    a C clip,
    wherein said C clip is inserted through said slots for limiting the displacement of said link bar protective sleeve.

12. The side-by-side flexible structure for adjacent vehicles of claim 1, wherein said first mechanical articulating joint comprises:
    a stops pivot joint support including at least a first tab with a first plurality of holes and a second tab with a second plurality of holes,
    wherein said stops pivot joint support is attached to said first vehicle frame,
    a fixed bushing,
    a movable bushing,
    wherein the first plurality of holes is aligned with the second plurality of holes.

13. The side-by-side flexible structure for adjacent vehicles of claim 1, wherein said first mechanical articulating joint comprises:
    a L spring including a first end and a second end,
    a first butted bushing attached to said first frame,
    a first threaded insert,
    a second threaded insert,
    a first hollow bolt,
    a second hollow bolt,
    wherein said first end is inserted in said first hollow bolt and said second end is inserted in said second hollow bolt,
    wherein the angle of inclination of said first end in relation to the horizontal comprises an inclination angle adjustable mechanism.

* * * * *